(12) United States Patent
Matsumoto

(10) Patent No.: US 10,036,421 B2
(45) Date of Patent: Jul. 31, 2018

(54) LINEAR MOTION GUIDE DEVICE

(71) Applicant: NSK Ltd., Shinagawa-ku, Tokyo (JP)

(72) Inventor: Jun Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 29 days.

(21) Appl. No.: 15/322,750

(22) PCT Filed: Jun. 25, 2015

(86) PCT No.: PCT/JP2015/003201
§ 371 (c)(1),
(2) Date: Dec. 29, 2016

(87) PCT Pub. No.: WO2016/002170
PCT Pub. Date: Jan. 7, 2016

(65) Prior Publication Data
US 2017/0159711 A1    Jun. 8, 2017

(30) Foreign Application Priority Data
Jul. 3, 2014    (JP) .................................. 2014-138023

(51) Int. Cl.
*F16C 29/06*    (2006.01)
*F16C 33/58*    (2006.01)

(52) U.S. Cl.
CPC ...... *F16C 29/0604* (2013.01); *F16C 29/0642* (2013.01); *F16C 29/0647* (2013.01); *F16C 33/585* (2013.01); *F16C 2240/34* (2013.01)

(58) Field of Classification Search
CPC .............. F16C 29/0604; F16C 29/0642; F16C 29/0647; F16C 33/585; F16C 2240/34
(Continued)

(56) References Cited

U.S. PATENT DOCUMENTS 4,664,535 A      5/1987  Mottate
4,898,478 A  *   2/1990  Osawa .................. F16O 29/005
                                                    384/45
(Continued)

FOREIGN PATENT DOCUMENTS

DE      36 07 479 A1    12/1986
JP      61-241526 A     10/1986
(Continued)

OTHER PUBLICATIONS

Machine translation of JPH 4-102715.*
(Continued)

*Primary Examiner* — Thomas R Hannon
(74) *Attorney, Agent, or Firm* — Crowell & Moring LLP

(57) ABSTRACT

There is provided a linear motion guide device that is reduced in a contact surface pressure between a ball and a raceway groove so that an occurrence of an edge load can hardly occur, even when any of a pressing load, a tensile load, and a lateral load is applied to a slider. Upper flanks and lower flanks included in raceway grooves of a guide rail and a slider each include: a main arc portion having an arc-shaped section and placed generally in a center of the flank in a width direction; a groove shoulder side sub-arc portion having an arc-shaped section and formed continuously from a groove shoulder side of the main arc portion; and a groove bottom side sub-arc portion having an arc sectional shape and formed continuously from a groove bottom side of the main arc portion. Further, a curvature radius of the groove shoulder side sub-arc portion is different from a curvature radius of the groove bottom side sub-arc portion.

14 Claims, 17 Drawing Sheets

(58) Field of Classification Search
USPC .......................................................... 384/516
See application file for complete search history.

(56) References Cited

U.S. PATENT DOCUMENTS

| | | | |
|---|---|---|---|
| 5,145,261 A | 9/1992 | Narumiya | |
| 6,123,458 A * | 9/2000 | Tsukada | ................ F16O 33/585 |
| | | | 384/45 |
| 6,984,068 B2 * | 1/2006 | Kato | ....................... F16O 29/06 |
| | | | 384/43 |
| 2003/0123762 A1 | 7/2003 | Kato | |
| 2005/0259896 A1 | 11/2005 | Kuo | |

FOREIGN PATENT DOCUMENTS

| | | | |
|---|---|---|---|
| JP | 63-180437 A | 7/1988 | |
| JP | 4-102715 A | 4/1992 | |
| JP | 2002-5178 A | 1/2002 | |
| JP | 2003-184874 A | 7/2003 | |
| JP | 2005-331099 A | 12/2005 | |
| JP | 2008-51129 A | 3/2008 | |
| JP | 2009-68650 A | 4/2009 | |
| JP | 5349451 B2 | 11/2013 | |

OTHER PUBLICATIONS

International Search Report (PCT/ISA/210) issued in PCT Application No. PCT/JP2015/003201 dated Sep. 15, 2015 with English translation (five pages).
Japanese-language Written Opinion (PCT/ISA/237) issued in PCT Application No. PCT/JP2015/003201 dated Sep. 15, 2015 (four pages).
International Preliminary Report on Patentability (PCT/IB/338 & PCT/IB/373) issued in PCT Application No. PCT/JP2015/003201 dated Jan. 12, 2017, including English-translation of document C2 (Japanese-language Written Opinion (PCT/ISA/237)) previously filed on Dec. 29, 2016 (seven (7) pages).
Extended European Search Report issued in counterpart European Application No. 15814467.5 dated Jul. 4, 2017 (9 pages).

* cited by examiner

LINEAR MOTION GUIDE DEVICE

TECHNICAL FIELD

The present invention relates to a linear motion guide device.

BACKGROUND ART

A linear motion guide device includes a guide rail extending in a linear shape, and a slider assembled to the guide rail so as to be movable in a longitudinal direction of the guide rail. A raceway groove constituted by a recessed groove extending in the longitudinal direction of the guide rail is formed on a surface of the guide rail, and a raceway groove constituted by a recessed groove opposed to the raceway groove on the guide rail is formed on a surface of the slider. A rolling passage on which balls as rolling elements are to roll is formed between the raceway groove of the guide rail and the raceway groove of the slider and the rolling passage extends in the longitudinal direction of the guide rail. A plurality of balls is rollably disposed in the rolling passage, and the slider is guided by the guide rail so as to be movable through the rolling of the plurality of balls in the rolling passage.

As the raceway groove in such a linear motion guide device, generally, an arcuate groove having a single-arc sectional shape (sectional shape cut on a plane perpendicular to the longitudinal direction of the guide rail), or a gothic-arc groove having a generally V-shaped sectional shape is used. When the gothic-arc groove is employed as the raceway groove, there is such an advantage that accuracy of a dimension, a shape, or the like of the raceway groove is easily secured.

In a linear motion guide device as described in PTL 1, 2, a gothic-arc groove is provided as a raceway groove, and when the linear motion guide device is used, a ball makes contact with only one flank out of two flanks constituting the gothic-arc groove. A sectional shape of either flank is a single-arc shape.

In the meantime, in a linear motion guide device as described in PTL 3, a sectional shape of a flank of a raceway groove is a combined-arc shape in which a plurality of arcs having different curvature radiuses is continuous with each other. With such a configuration, a contact surface pressure between a ball and the raceway groove is reduced, so that a life of the linear motion guide device increases and a coefficient of dynamic friction is reduced.

However, the technique described in PTL 3 is achieved on the premise of a case where a sectional shape of the raceway groove is linearly symmetric across a line of action of a load to be applied to a contact point between the ball and the raceway groove with the line of action of the load being taken as an axis of symmetry. Accordingly, like the linear motion guide device described in PTL 1, 2, in a case where the sectional shape of the raceway groove is not linearly symmetric but asymmetric across a line of action of a load to be applied to a contact point between the ball and the raceway groove with the line of action of the load being taken as an axis of symmetry, even if the technique described in PTL 3 is applied, a contact surface pressure between the ball and the raceway groove might not be reduced sufficiently.

That is, in a linear motion guide device in which a sectional shape of a raceway groove is linearly symmetric across a line of action of a load as an axis of symmetry, in a case where a load (hereinafter referred to as a "pressing load") directed vertically downward is applied to a slider like a case where an object is put on the slider, in a case where a load (hereinafter referred to as a "tensile load") directed vertically upward is applied to the slider, or in a case where a load (hereinafter referred to as a "lateral load") along a guide-rail width direction is applied to the slider, even if the load is applied, a pressure pattern at a contact point between a ball and the raceway groove does not change. However, in a linear motion guide device in which a sectional shape of a raceway groove is asymmetric across a line of action of a load as an axis of symmetry, a pressure pattern changes at the time when the load is applied, and therefore, an effect of reducing the contact surface pressure between the ball and the raceway groove cannot be obtained sufficiently, which might cause an edge load.

More specifically, when a tensile load is applied to the slider, a contact angle increases in comparison with a state where the tensile load has not been applied, so that a range of a contact stress generated in a contacting portion between a flank of the raceway groove and the ball increases, which may cause the range to reach a chamfer provided in a groove shoulder of the raceway groove. When the range of the contact stress reaches the chamfer, an edge load occurs in an edge of the chamfer because the contact stress cannot be received by the chamfer. The edge load is a remarkable pressure peak, and therefore causes plastic deformation of materials constituting the guide rail and the slider. When the raceway groove deforms plastically, smooth circulation of the ball is prevented, and thus, the occurrence of the edge load is unfavorable.

Further, when a lateral load is applied to the slider, the contact angle decreases in comparison with a state where the lateral load has not been applied, so that the range of the contact stress generated in the contacting portion between the flank of the raceway groove and the ball increases, which may cause the range to reach a wire groove (a groove that partially accommodates a cage to prevent interference between the cage and the guide rail) provided on a groove bottom of the raceway groove. Since the wire groove cannot receive a contact stress, an edge load occurs in the edge portion of the wire groove.

CITATION LIST

Patent Literatures

PTL 1: JP 61-241526 A
PTL 2: JP 63-180437 A
PTL 3: JP 2008-51129 A

SUMMARY OF INVENTION

Technical Problem

In view of this, the present invention is intended to solve the problems of the above conventional techniques, and to provide a linear motion guide device that is reduced in a contact surface pressure between a ball and a raceway groove so that an edge load can hardly occur, even when any of a pressing load, a tensile load, and a lateral load is applied to a slider.

Solution to Problem

In order to solve the above problem, a linear motion guide device according to one aspect of the present invention includes a guide rail, a slider, and a plurality of balls, wherein: the guide rail and the slider include respective raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, a groove shoulder side sub-arc portion having an arc sectional shape and formed continuously from a groove shoulder side of the main arc portion, and a groove bottom side sub-arc portion having an arc sectional shape and formed continuously from a groove bottom side of the main arc portion; and a curvature radius r2p of the groove shoulder side sub-arc portion is different from a curvature radius r2m of the groove bottom side sub-arc portion.

In the linear motion guide device, when an arc central angle of the groove shoulder side sub-arc portion is assumed Hp and an arc central angle of the groove bottom side sub-arc portion is assumed Hm, the following condition A or condition B may be satisfied:

$$Hp > Hm \text{ and } r2p < r2m, \quad \text{Condition A:}$$

$$Hp < Hm \text{ and } r2p > r2m. \quad \text{Condition B:}$$

Further, in the linear motion guide device, in terms of all flanks making contact with the balls among the flanks, their main arc portions may have the same curvature radius r1, their groove shoulder side sub-arc portions may have the same curvature radius r2p, and their groove bottom side sub-arc portions may have the same curvature radius r2m, and in terms of all the flanks making contact with the balls among the flanks, assuming that a minimum value in arc central angles Hp of the groove shoulder side sub-arc portions is Hpmin and a minimum value in arc central angles Hm of the groove bottom side sub-arc portions is Hpmin, the following condition C or condition D may be satisfied:

$$H p\min > H p\min \text{ and } r2p < r2m, \quad \text{Condition C:}$$

$$H p\min < H p\min \text{ and } r2p > r2m. \quad \text{Condition D:}$$

Further, a linear motion guide device according to another aspect of the present invention includes a guide rail, a slider, and a plurality of balls, wherein: the guide rail and the slider include raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, and a groove shoulder side sub-arc portion having an arc sectional shape and formed continuously from a groove shoulder side of the main arc portion; when an arc central angle Hp of the groove shoulder side sub-arc portion is not less than 4° but less than 6°, a curvature radius r2p of the groove shoulder side sub-arc portion is more than 0.62 times as large as a diameter of the balls; when the arc central angle Hp of the groove shoulder side sub-arc portion is not less than 6° but less than 10°, the curvature radius r2p of the groove shoulder side sub-arc portion is more than 0.54 times but not more than 0.62 times as large as the diameter of the balls; and when the arc central angle Hp of the groove shoulder side sub-arc portion is not less than 10°, the curvature radius r2p of the groove shoulder side sub-arc portion is not more than 0.54 times as large as the diameter of the balls.

Further, a linear motion guide device according to another aspect of the present invention includes a guide rail, a slider, and a plurality of balls, wherein: the guide rail and the slider include raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, and a groove bottom side sub-arc portion having an arc sectional shape and formed continuously from a groove bottom side of the main arc portion; when an arc central angle Hm of the groove bottom side sub-arc portion is not less than 4° but less than 6°, a curvature radius r2m of the groove bottom side sub-arc portion is more than 0.62 times as large as a diameter of the balls; when the arc central angle Hm of the groove bottom side sub-arc portion is not less than 6° but less than 10°, the curvature radius r2m of the groove bottom side sub-arc portion is more than 0.54 times but not more than 0.62 times as large as the diameter of the balls; and when the arc central angle Hm of the groove bottom side sub-arc portion is not less than 10°, the curvature radius r2m of the groove bottom side sub-arc portion is not more than 0.54 times as large as the diameter of the balls.

Further, a linear motion guide device according to another aspect of the present invention includes a guide rail, a slider, and a plurality of balls, wherein: the guide rail and the slider include raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, and a groove shoulder side sub-arc portion having an arc sectional shape and formed continuously from a groove shoulder side of the main arc portion; in terms of all flanks making contact with the balls among the flanks, their main arc portions have the same curvature radius r1, and their groove shoulder side sub-arc portions have the same curvature radius r2p; and in terms of all the flanks making contact with the balls among the flanks, assuming that a minimum value in arc central angles Hp of the groove shoulder side sub-arc portions is Hpmin, when Hpmin is not less than 4° but less than 6°, the curvature radius r2p of the groove shoulder side sub-arc portions is more than 0.62 times as large as a diameter of the balls, when Hpmin is not less than 6° but less than 10°, the curvature radius r2p of the groove shoulder side sub-arc portions is more than 0.54 but not more than 0.62 times as large as the diameter of the balls, and when Hpmin is not less than 10°, the curvature radius r2p of the groove shoulder side sub-arc portions is not more than 0.54 times as large as the diameter of the balls.

Further, a linear motion guide device according to another aspect of the present invention includes a guide rail, a slider, and a plurality of balls, wherein: the guide rail and the slider include raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, and a groove bottom side sub-arc portion having an arc sectional shape and formed continuously from a groove bottom side of the main arc portion; in terms of all flanks making contact with the balls among the flanks, their main arc portions have the same curvature radius r1 and their groove bottom side sub-arc portions have the same curvature radius r2m; and in terms of all the flanks making contact with the balls among the flanks, assuming that a minimum value in arc central angles Hm of the groove bottom side sub-arc portions is Hmmin, when Hmmin is not less than 4° but less than 6°, the curvature radius r2m of the groove bottom side sub-arc portions is more than 0.62 times as large as a diameter of the balls, when Hmmin is not less than 6° but less than 10°, the curvature radius r2m of the groove bottom side sub-arc portions is more than 0.54 but not more than 0.62 times as large as the diameter of the balls, and when Hmmin is not less than 10°, the curvature radius r2m of the groove bottom side sub-arc portions is not more than 0.54 times as large as the diameter of the balls.

Further, a linear motion guide device according to another aspect of the present invention includes a guide rail, a slider, and a plurality of balls, wherein: the guide rail and the slider include raceway grooves at positions opposed to each other so as to form a rolling passage for the balls; the respective raceway grooves extend in a longitudinal direction of the guide rail; the balls are placed in the rolling passage; the slider is guided by the guide rail so as to be movable in the longitudinal direction through rolling of the balls in the rolling passage; flanks included in the raceway grooves each include a main arc portion having an arc sectional shape and placed generally in a center of the flank in a width direction, a groove shoulder side sub-arc portion having an arc sectional shape and formed continuously from a groove shoulder side of the main arc portion, and a groove bottom side sub-arc portion having an arc sectional shape and formed continuously from a groove bottom side of the main arc portion; in terms of all flanks making contact with the balls among the flanks, their main arc portions have the same curvature radius r1, their groove shoulder side sub-arc portions have the same curvature radius r2p, and their groove bottom side sub-arc portions have the same curvature radius r2m; and in terms of all the flanks making contact with the balls among the flanks, assuming that a minimum value in arc central angles Hp of the groove shoulder side sub-arc portions is Hpmin and a minimum value in arc central angles Hm of the groove bottom side sub-arc portions is Hpmin, when Hpmin is not less than 4° but less than 6°, the curvature radius r2p of the groove shoulder side sub-arc portions is more than 0.62 times as large as a diameter of the balls, when Hpmin is not less than 6° but less than 10°, the curvature radius r2p of the groove shoulder side sub-arc portions is more than 0.54 but not more than 0.62 times as large as the diameter of the balls, when Hpmin is not less than 10°, the curvature radius r2p of the groove shoulder side sub-arc portions is not more than 0.54 times as large as the diameter of the balls, when Hpmin is not less than 4° but less than 6°, the curvature radius r2m of the groove bottom side sub-arc portions is more than 0.62 times as large as a diameter of the balls, when Hmmin is not less than 6° but less than 10°, the curvature radius r2m of the groove bottom side sub-arc portions is more than 0.54 but not more than 0.62 times as large as the diameter of the balls, and when Hmmin is not less than 10°, the curvature radius r2m of the groove bottom side sub-arc portions is not more than 0.54 times as large as the diameter of the balls.

In these linear motion guide devices, the main arc portion and the groove shoulder side sub-arc portion may be smoothly connected to each other so as to share a tangent, or the main arc portion and the groove bottom side sub-arc portion may be smoothly connected to each other so as to share a tangent.

Further, in these linear motion guide devices, the main arc portion may be placed in an equal range toward both sides of the flank in the width direction around a contact point between the ball and the flank, and an arc central angle K of the main arc portion may be 40°.

Further, in these linear motion guide devices, the curvature radius r1 of the main arc portion may be not less than 0.51 times but not more than 0.52 times as large as the diameter of the balls.

Further, in these linear motion guide devices, at least one of the raceway grooves may be a gothic-arc groove having a generally V-shaped section with two flanks, and one of the two flanks included in the raceway groove may be a main flank that makes contact with the balls at the time of use and the other one of them may be a sub-flank that does not make contact with the balls at the time of use. Sectional shapes of the main flank and the sub-flank may form a line symmetry to each other.

Advantageous Effects of Invention

Even when any of a pressing load, a tensile load, and a lateral load is applied to a slider, the linear motion guide device of the present invention is reduced in a contact surface pressure between balls and a raceway groove, so that an edge load can hardly occur.

DESCRIPTION OF EMBODIMENTS

The following describes embodiments of a linear motion guide device of the present invention in detail with reference to the drawings. Note that, in each drawing referred to in the description made hereinafter, the same or equivalent portions have the same reference sign. Further, when the following description describes "section," it means a section cut along a plane perpendicular to a longitudinal direction of a guide rail, unless otherwise specified. Further, terms indicating directions such as "upper," "lower," "left," and "right," in the following description indicate corresponding directions in FIG. 2 for purposes of this description, unless otherwise specified.

First Embodiment

Figure 1:
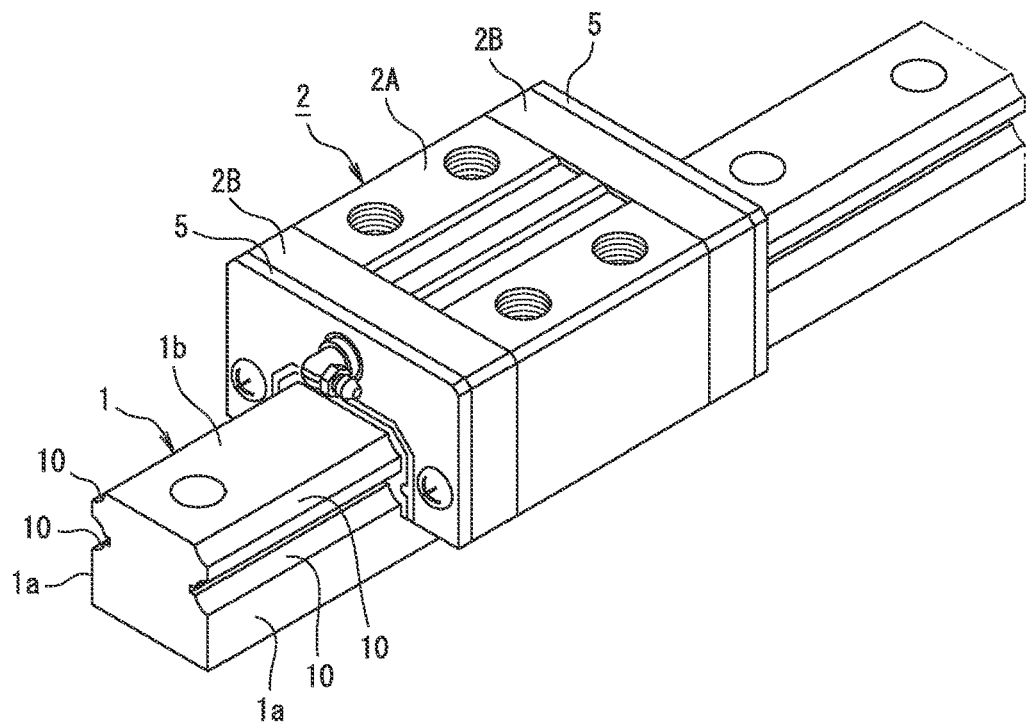
FIG. 1 is a perspective view illustrating a structure of a linear motion guide device according to a first embodiment of the present invention.
Figure 2:
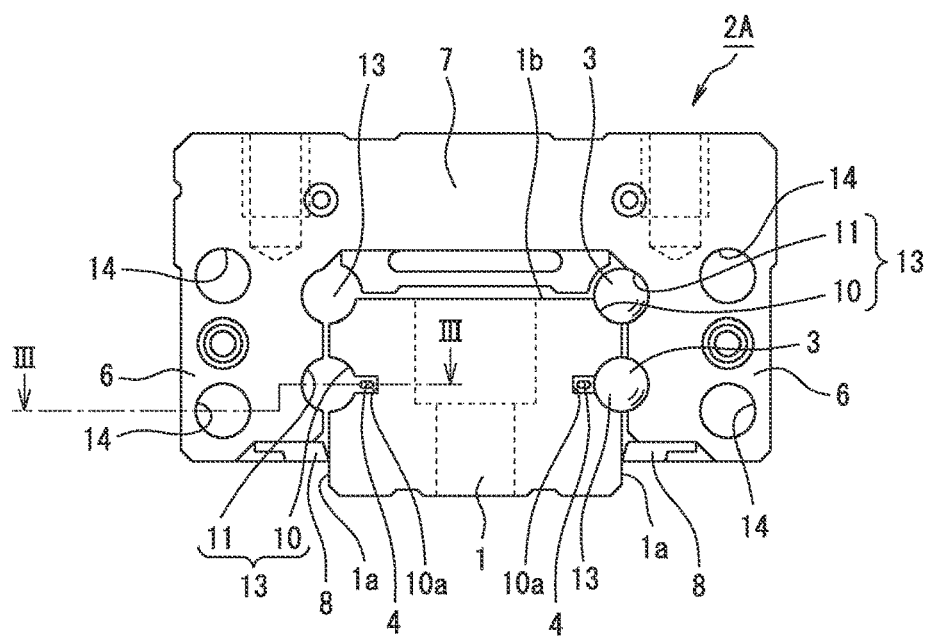
FIG. 2 is a front view of the linear motion guide device of FIG. 1 when viewed from a longitudinal end side of a guide rail (note that an endcap is not illustrated herein)

As illustrated in FIGS. 1, 2, a slider 2 having a generally U-shaped sectional shape is assembled onto a guide rail 1 extending linearly and having a generally rectangular sectional shape, so that the slider 2 is movable in a longitudinal direction of the guide rail 1 (hereinafter referred to as "the longitudinal direction"). Raceway grooves 10, 10 constituted by a recessed groove extending in the longitudinal direction are formed in respective edge portions where respective right and left side faces 1a, 1a of the guide rail 1 in a width direction intersect with a top face 1b.

Further, raceway grooves 10, 10 constituted by a recessed groove extending in the longitudinal direction are formed generally in respective central parts, in an up-down direction, of the right and left side faces 1a, 1a of the guide rail 1 in the width direction. Cage clearance grooves 10a (wire grooves) that accommodate part of a cage 4 so as to prevent interference between the cage 4 and the guide rail 1 are formed in groove bottoms of the raceway grooves 10, 10 formed generally in the respective central parts, in the up-down direction, of the right and left side faces 1a, 1a of the guide rail 1 in the width direction, such that the cage clearance grooves 10a are formed along the longitudinal direction over both ends of a moving region of the slider 2 (e.g., both ends of the guide rail 1 in the longitudinal direction). A sectional shape of the cage clearance groove 10a is generally rectangular, for example.

Further, the slider 2 is constituted by a flat body portion 7 opposed to the top face 1b of the guide rail 1, and two leg portions 6, 6 extending downward from respective right and left side portions of the body portion 7 so as to be opposed to respective side faces 1a of the guide rail 1. A sectional shape of the slider 2 is a generally U-shape because respective angles formed between the body portion 7 and the respective leg portions 6, 6 are generally right angles. The slider 2 is movably attached to the guide rail 1 so as to sandwich the guide rail 1 between the leg portions 6, 6.

Such a slider 2 includes a slider body 2A, and endcaps 2B, 2B removably attached to both ends (both ends in the longitudinal direction or both ends in a moving direction of the slider 2) of the slider body 2A. Further, side shields 5, 5 are attached to both ends (outer sides of the endcaps 2B in the longitudinal direction) of the slider 2 such that the side shields 5, 5 make sliding contact with outer surfaces (the top face 1b and the side faces 1a, 1a) of the guide rail 1 so as to seal parts of openings of a gap between the guide rail 1 and the slider 2, the parts facing end surface sides in the longitudinal direction. Underseals 8, 8 are attached to a lower part of the slider 2 such that the underseals 8, 8 seal parts of the openings of the gap between the guide rail 1 and the slider 2, the parts facing a bottom side of the slider 2. The side shields 5, 5 and the underseals 8, 8 prevent invasion of a foreign matter into the gap from outside, and leakage of lubricant from the gap to outside.

Further, raceway grooves 11, 11, 11, 11 constituted by recessed grooves opposed to the raceway grooves 10, 10, 10, 10 on the guide rail 1 are formed in corner parts and generally central parts, in the up-down direction, of inner surfaces of the right and left leg portions 6, 6 of the slider body 2A. Rolling passages 13, 13, 13, 13 having a generally circular section are formed between the raceway grooves 10, 10, 10, 10 of the guide rail 1 and the raceway grooves 11, 11, 11, 11 of the slider 2, and the rolling passages 13, 13, 13, 13 extend in the longitudinal direction (see FIGS. 2 and 3).

A plurality of balls 3 as rolling elements is held by the cage 4 and rollably put in the rolling passages 13, so that the slider 2 is movable in the longitudinal direction by being guided by the guide rail 1 via the balls 3 rolling in the rolling passages 13. The cage 4 is formed of a wire, for example, and holds the balls 3 so as to prevent the balls 3 from falling off from the slider 2 that has not been assembled to the guide rail 1, for example, before the guide rail 1 is assembled.

Note that the number of raceway grooves 10, 11 provided in the guide rail 1 and the slider 2 is not limited to two lines on one side, but may be one line or three lines or more on one side.

Figure 3:
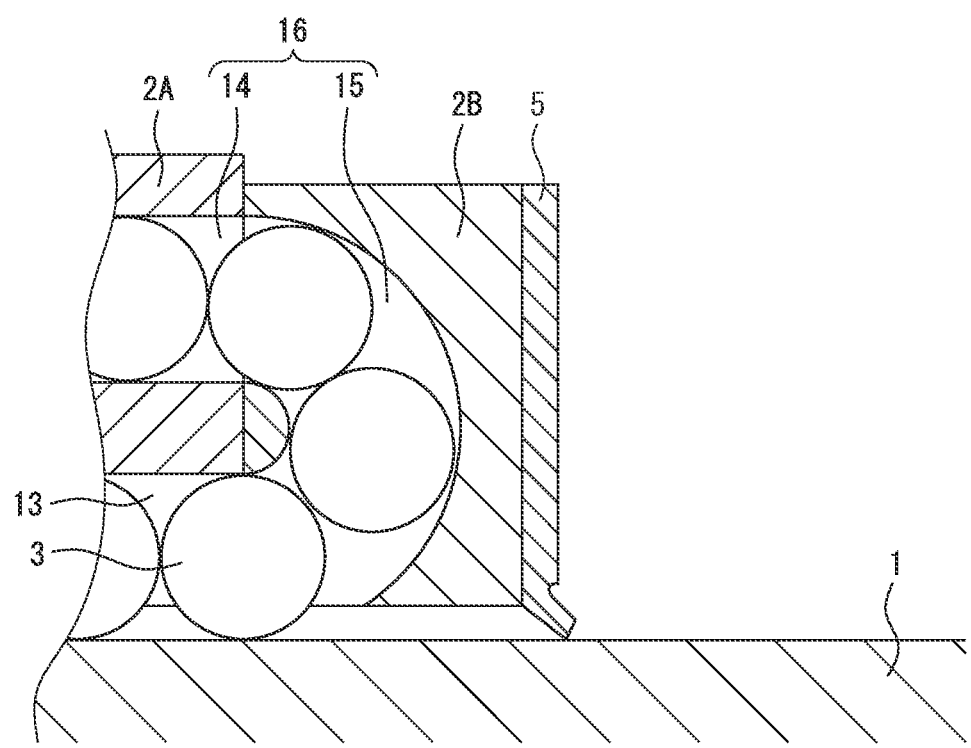
FIG. 3 is a sectional view of the linear motion guide device taken along a line in FIG. 2.

Further, the slider 2 includes, in respective upper parts and respective lower parts of the right and left leg portions 6, 6 of the slider body 2A, return passages 14, 14, 14, 14 constituted by through-holes having a generally circular sectional shape and provided in parallel to the rolling passages 13, 13, 13, 13 in a penetrating manner in the longitudinal direction (see FIGS. 2, 3).

In the meantime, the endcap 2B is constituted by a molded product made of a resin material, for example, and a sectional shape thereof is a generally U-shape. Further, direction change passages 15 having a circular sectional shape and curving in an arc shape are formed at two stages in the up-down direction on right and left sides of a back surface (an abutting surface with the slider body 2A) of the endcap 2B (see FIG. 3). When the endcap 2B is attached to the slider body 2A with fastening members such as screws, the rolling passage 13 communicates with the return passage 14 via the direction change passage 15. Note that a sectional shape of the direction change passage 15 is a sectional shape cut on a plane perpendicular to a continuous direction of the direction change passage 15.

The return passages 14 and the direction change passages 15, 15 on both ends constitute rolling element conveying passages 16 on which the balls 3 are conveyed from end points of the rolling passages 13 to initial points thereof in a circulating manner (the number of rolling element conveying passages 16 to be provided is the same as the number of rolling passages 13), and the rolling passage 13 and the rolling element conveying passage 16 constitute a generally annular circulation path (see FIG. 3). The generally annular circulation path is formed on the right and left sides across the guide rail 1.

When the slider 2 assembled to the guide rail 1 moves along the guide rail 1 in the longitudinal direction, the balls 3 thus put in the rolling passage 13 roll in the rolling passage 13 and move in the same direction as the slider 2 with respect to the guide rail 1. When the ball 3 reaches the end point of the rolling passage 13, the ball 3 is taken up from the rolling passage 13 and sent to the direction change passage 15. The ball 3 that has entered the direction change passage 15 makes a U-turn so as to be introduced into the return passage 14, and reaches the direction change passage 15 on an opposite side through the return passage 14. The ball 3 makes a U-turn here again and returns to the initial point of the rolling passage 13, and such circulation in the circulation path is repeated endlessly.

Hereby, the following further more specifically describes the raceway grooves 10, 11. Among four raceway grooves 10, 10, 10, 10 included in the guide rail 1, two raceway grooves 10, 10 (hereinafter referred to as "rail upper grooves 10") formed in the edge portions where both side faces 1a, 1a intersect with the top face 1b are grooves including a single flank. Further, among the four raceway grooves 10, 10, 10, 10 included in the guide rail 1, two raceway grooves 10, 10 (hereinafter referred to as "rail lower grooves 10") formed generally in the central parts, in the up-down direction, of the side faces 1a, 1a are gothic-arc grooves having a generally V-shaped section including two flanks (an upper flank 20U and a lower flank 20L).

Further, four raceway grooves 11, 11, 11, 11 included in the slider body 2A (hereinafter, two raceway grooves 11, 11 opposed to the rail upper grooves 10 may be referred to as "slider upper grooves 11" and two raceway grooves 11, 11 opposed to the rail lower grooves 10 may be referred to as "slider lower grooves 11") are gothic-arc grooves having a generally V-shaped section including two flanks (an upper flank 20U and a lower flank 20L).

Figure 4:
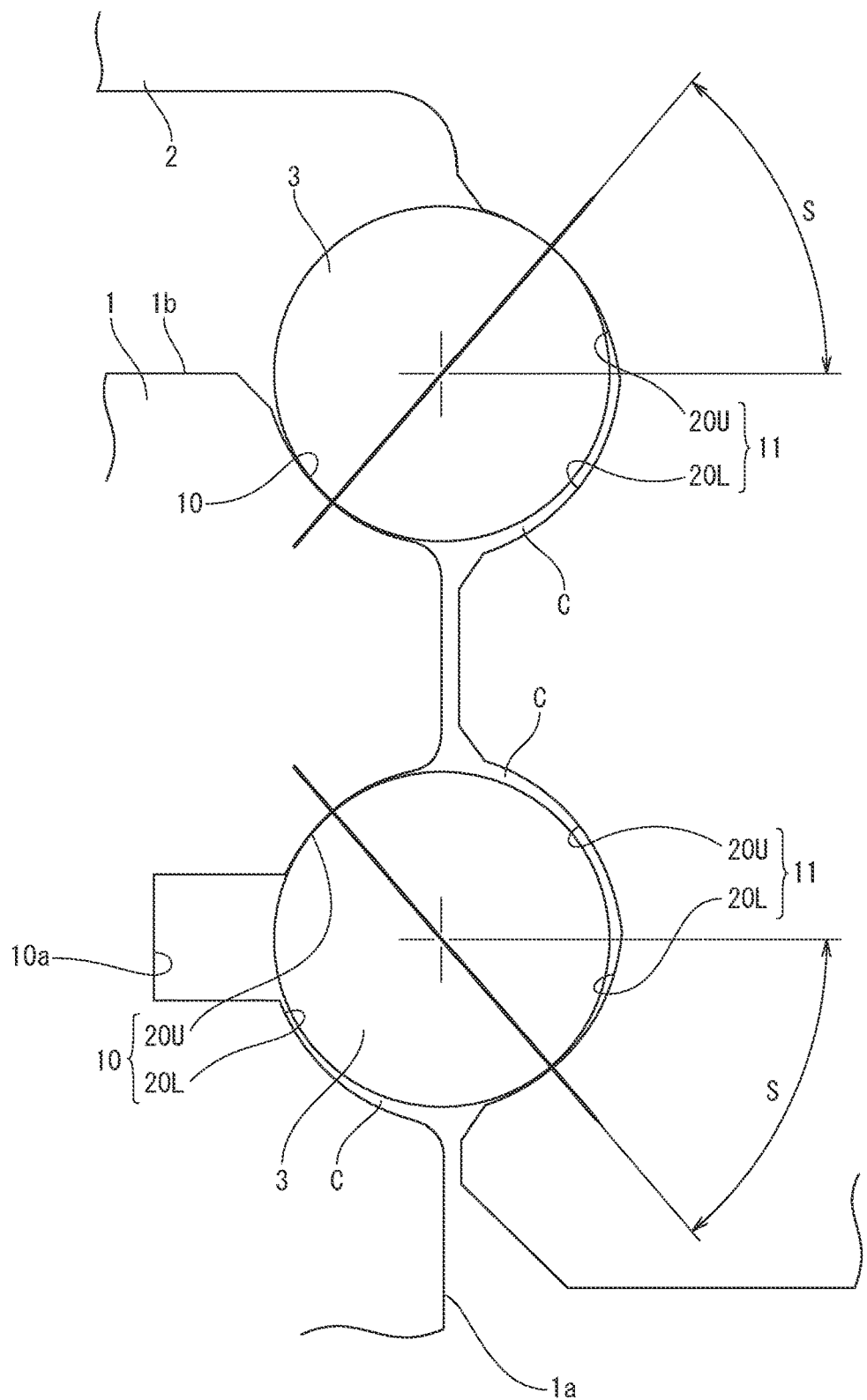
FIG. 4 is an enlarged view of an essential part in FIG. 2.

At the use of the linear motion guide device, one of two flanks 20U, 20L of each of the rail lower grooves 10, the slider upper grooves 11, and the slider lower grooves 11 is a main flank that makes contact with the balls 3, and the other one of them is a sub-flank that does not make contact with the balls 3. More specifically, as illustrated in FIG. 4, for example, in the rolling passage 13 on an upper side, the upper flank 20U of the slider upper groove 11 and the flank of the rail upper groove 10 make contact with the ball 3, and in the rolling passage 13 on a lower side, the lower flank 20L of the slider upper groove 11 and the upper flank 20U of the rail upper groove 10 make contact with the ball 3. At this time, their contact angles S are 50°, for example. The flanks other than them (that is, the lower flank 20L of the slider upper groove 11, the upper flank 20U of the slider lower groove 11, and the lower flank 20L of the rail lower groove 10) do not make contact with the ball 3, and a gap C of a few μm to several dozens μm is formed between these flanks and the ball 3.

Figure 6:
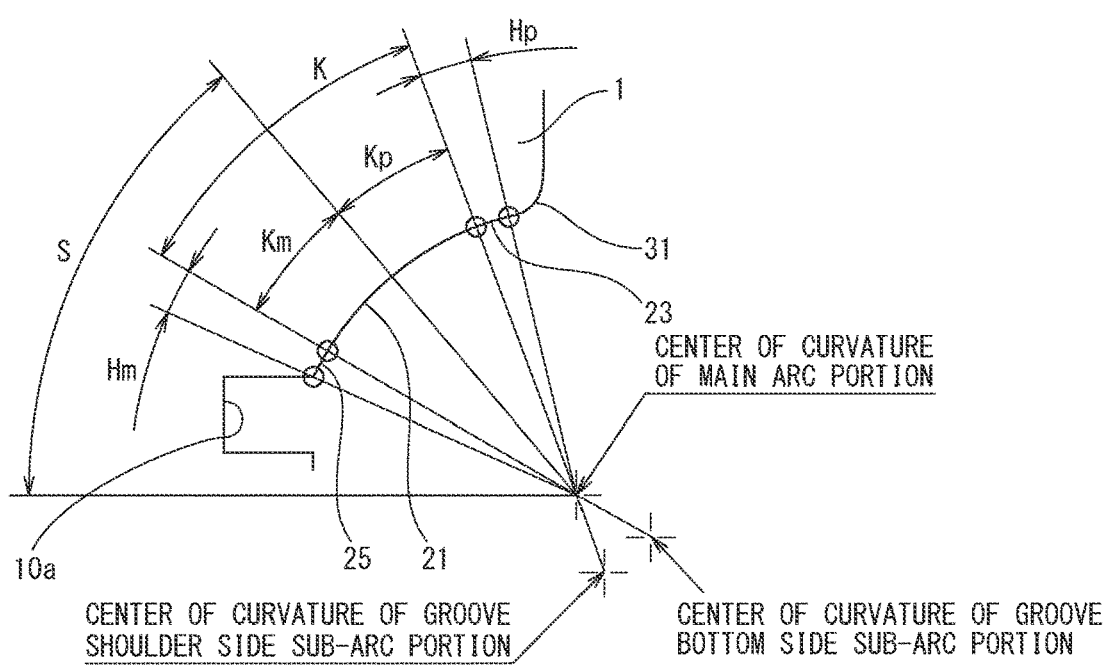
FIG. 6 is a view to describe an upper flank of the rail lower groove.
Figure 7:
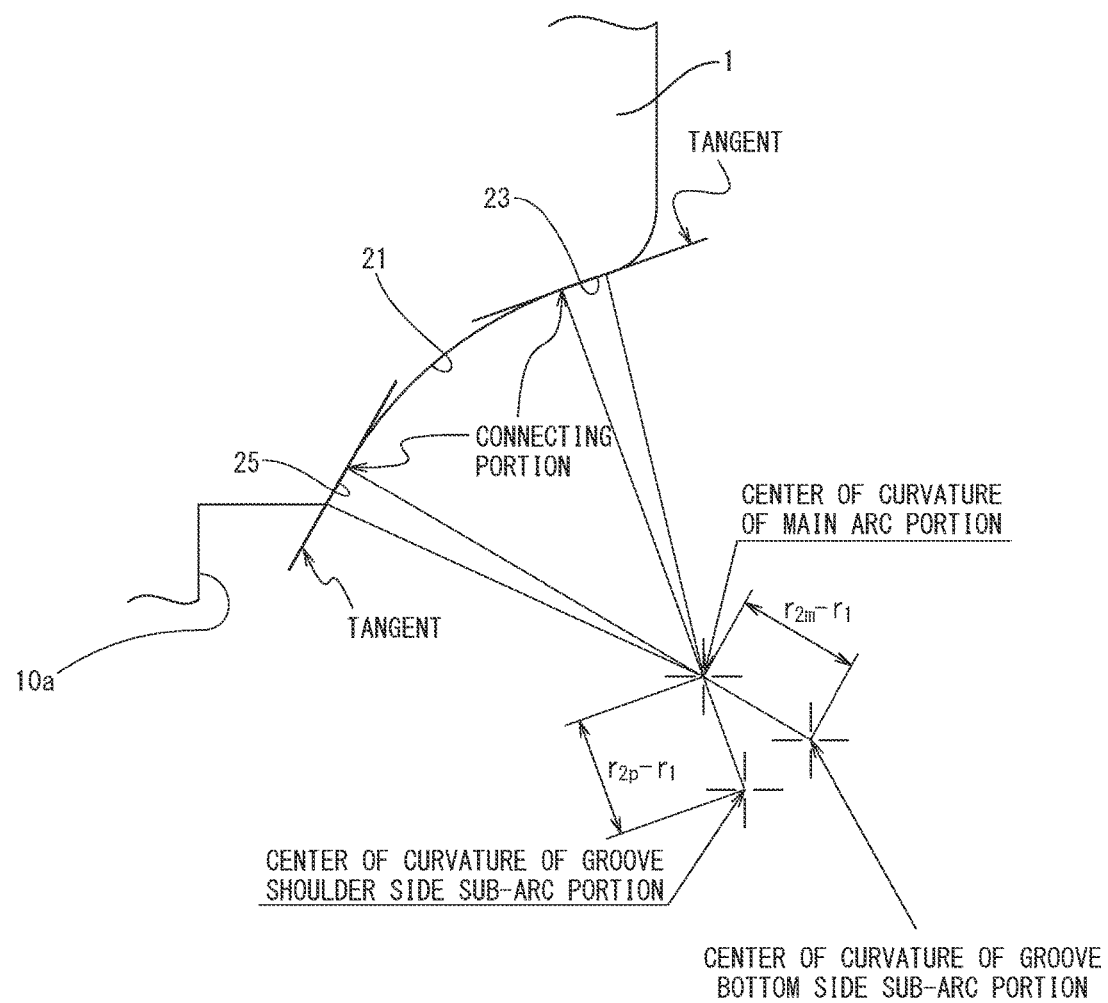
FIG. 7 is a view to describe the upper flank of the rail lower groove.

Next will be described the upper flank 20U and the lower flank 20L included in the rail lower groove 10, with reference to FIGS. 5 to 7. The upper flank 20U and the lower flank 20L included in the rail lower groove 10 have sectional shapes forming a line symmetry in the up-down direction (that is, a sectional shape of the rail lower groove 10 is a line-symmetric shape), and each of the flanks 20U, 20L includes a main arc portion 21 having an arc sectional shape and placed generally in a center of the flank 20U, 20L in a width direction, a groove shoulder side sub-arc portion 23 having an arc sectional shape and formed continuously from a groove shoulder side of the main arc portion 21, and a groove bottom side sub-arc portion 25 having an arc sectional shape and formed continuously from a groove bottom side of the main arc portion 21.

A curvature radius r1 of the main arc portion 21 is slightly larger than a radius of the ball 3. As the curvature radius r1 of the main arc portion 21 on which a contact point of the ball 3 is placed is smaller, a contact surface pressure between the ball 3 and the rail lower groove 10 is reduced, so that a life of the linear motion guide device improves. However, when the curvature radius r1 of the main arc portion 21 is too small, the contact between the ball 3 and the main arc portion 21 might be unstable due to a manufacture tolerance. On this account, it is preferable that the curvature radius r1 of the main arc portion 21 be not less than 0.51 times but not more than 0.52 times as large as a diameter of the ball 3. For example, the diameter of the ball 3 may be 5.556 mm, and the curvature radius r1 of the main arc portion 21 may be 2.834 mm (0.51 times as large as the diameter of the ball 3).

Figure 5:
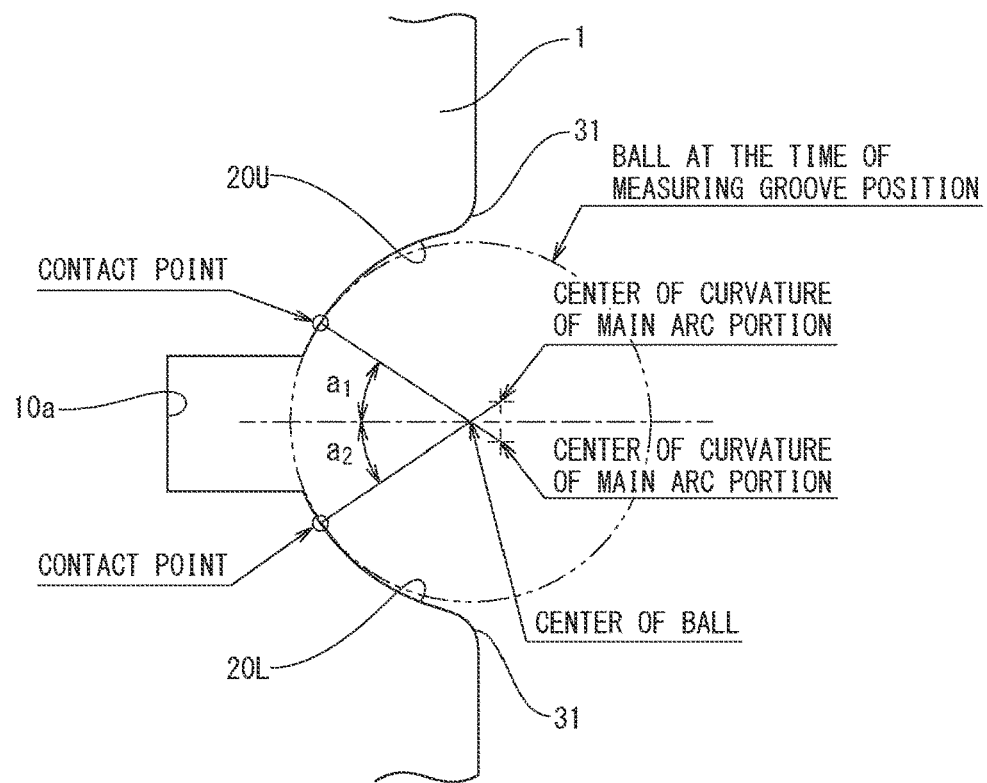
FIG. 5 is an enlarged view of a rail lower groove.

When a position of the rail lower groove 10 is measured after the guide rail 1 is manufactured, a ball for measurement is placed in the rail lower groove 10 so as to make contact with both the upper flank 20U and the lower flank 20L (see FIG. 5). Since the rail lower groove 10 includes two flanks 20U, 20L, a position of the ball for measurement is more stable than a case where only one flank is provided. Accordingly, it is possible to highly precisely measure a height position (a position in the up-down direction) of the rail lower groove 10 and a distance, in the width direction, of the guide rail 1 between two rail lower grooves 10, 10. In terms of contact angles of the ball for measurement, a contact angle a1 at the upper flank 20U can be 36°, and a contact angle a2 at the lower flank 20L can be 36°.

Since the rail upper groove 10 of the guide rail 1 has one flank, it is difficult to highly precisely measure a position of the rail upper groove 10 directly. However, the rail upper groove 10 of the guide rail 1 can be formed by grinding using a formed grinding wheel at the same time as the rail lower groove 10. With the use of the formed grinding wheel, it is relatively easy to guarantee a dimension with accuracy, so it is also possible to guarantee the position of the rail upper groove 10 by measuring only the position of the rail lower groove 10 without measuring the position of the rail upper groove 10 of the guide rail 1.

Chamfers (R-chamfers) 31, 31 to be connected to a land portion are formed in both edge portions on groove shoulder sides of the rail lower groove 10. The chamfers 31 can prevent burrs from remaining in the edge portions of the rail lower groove 10 on the groove shoulder sides. A curvature radius of the chamfer 31 can be around 0.1 times as large as the diameter of the ball 3. Note that the curvature radius of the chamfers 31, 31 formed in both edge portions of the rail lower groove 10 on the groove shoulder sides may be the same as illustrated in FIG. 5, or may be different from each other.

Next will be described the main arc portions 21, the groove shoulder side sub-arc portions 23, and the groove bottom side sub-arc portions 25 included in the upper flank 20U and the lower flank 20L of the rail lower groove 10 by taking the upper flank 20U of the rail lower groove 10 as an example, with reference to FIG. 6. A sectional shape of the upper flank 20U of the rail lower groove 10 is a combined-arc shape in which the groove shoulder side sub-arc portion 23, the main arc portion 21, and the groove bottom side sub-arc portion 25 are continuous with each other.

The main arc portion 21 is disposed in an equal range toward both sides of the upper flank 20U in the width direction around a contact point between the ball 3 and the upper flank 20U, and an arc central angle K of the main arc portion 21 is 40°, for example. A part of the main arc portion 21 on the groove shoulder side relative to the contact point and a part thereof on the groove bottom side relative to the contact point have an equal range in the width direction of the upper flank 20U, and assuming that an arc central angle of the part on the groove shoulder side relative to the contact point is Kp and an arc central angle of the part on the groove bottom side relative to the contact point is Km, Kp and Km are 20 degrees, for example, in the first embodiment. Note that, in the present invention, the arc central angle of the main arc portion indicates a central angle of a sector formed by connecting a center of curvature of the main arc portion to both ends of the main arc portion with straight lines.

The groove shoulder side sub-arc portion 23 is formed between the main arc portion 21 and the chamfer 31 on a groove shoulder, and an arc central angle Hp of the groove shoulder side sub-arc portion 23 is 9.8°, for example, in the first embodiment. Further, the groove bottom side sub-arc portion 25 is formed between the main arc portion 21 and the cage clearance groove 10a, and an arc central angle Hm of the groove bottom side sub-arc portion 25 is 10.0°, for example, in the first embodiment. That is, sizes of the arc central angles Hp, Hm of the groove shoulder side sub-arc portion 23 and the groove bottom side sub-arc portion 25 are limited by dimensions of the chamfer 31 on the groove shoulder and the cage clearance groove 10a. Note that, in the present invention, the arc central angle of the groove shoulder side sub-arc portion indicates a central angle of a sector formed by connecting the center of curvature of the main arc portion to both ends of the groove shoulder side sub-arc portion with straight lines. Further, the arc central angle of the groove bottom side sub-arc portion indicates a central angle of a sector formed by connecting the center of curvature of the main arc portion to both ends of the groove bottom side sub-arc portion with straight lines.

When a range of the main arc portion 21 is too large (when an arc central angle K is too large), ranges of the groove shoulder side sub-arc portion 23 and the groove bottom side sub-arc portion 25 are narrowed (the arc central angles Hp, Hm are decreased), and design freedom of the groove shoulder side sub-arc portion 23 and the groove bottom side sub-arc portion 25 is decreased. In the meantime, when the range of the main arc portion 21 is too small (when the arc central angle K is too small), areas of the groove shoulder side sub-arc portion 23 and the groove bottom side sub-arc portion 25 are increased, so that a contact surface pressure is easily increased at the time when a load is applied. On this account, it is preferable that the arc central angle K of the main arc portion 21 be 40°.

A curvature radius r2p of the groove shoulder side sub-arc portion 23 and a curvature radius r2m of the groove bottom side sub-arc portion 25 are set to be slightly larger than the curvature radius r1 of the main arc portion 21. The main arc portion 21 and the groove shoulder side sub-arc portion 23 are smoothly connected to each other so as to share a tangent at their connecting portion. Further, similarly, the main arc portion 21 and the groove bottom side sub-arc portion 25 are smoothly connected to each other so as to share a tangent at their connecting portion.

The smooth connections thereof will be described below more specifically, with reference to FIG. 7. When the curvature radius of the main arc portion 21 is r1, the curvature radius of the groove shoulder side sub-arc portion 23 is r2p, and the curvature radius of the groove bottom side sub-arc portion 25 is r2m, the center of curvature of the main arc portion 21 is distanced from a center of curvature of the groove shoulder side sub-arc portion 23 only by r2p−r1, and the connecting portion between the main arc portion 21 and the groove shoulder side sub-arc portion 23 is placed on a straight line that connects the center of curvature of the main arc portion 21 to the center of curvature of the groove shoulder side sub-arc portion 23. Similarly, the center of curvature of the main arc portion 21 is distanced from a center of curvature of the groove bottom side sub-arc portion 25 only by r2m−r1, and the connecting portion between the main arc portion 21 and the groove bottom side sub-arc portion 25 is placed on a straight line that connects the center of curvature of the main arc portion 21 to the center of curvature of the groove bottom side sub-arc portion 25.

By smoothly connecting the main arc portion 21 to the groove shoulder side sub-arc portion 23 and to the groove bottom side sub-arc portion 25 as such, it is possible to prevent a sudden change in distribution of a contact surface pressure at the connecting portions and to restrain a decrease of the life of the linear motion guide device.

In the first embodiment, the curvature radius r2p of the groove shoulder side sub-arc portion 23 and the curvature radius r2m of the groove bottom side sub-arc portion 25 have different values such that the curvature radius r2p of the groove shoulder side sub-arc portion 23 is 3.223 mm (0.58 times as large as the diameter of the ball 3), for example, and the curvature radius r2m of the groove bottom side sub-arc portion 25 is 3.000 mm (0.54 times as large as the diameter of the ball 3), for example.

As such, in the rail lower groove 10 of the linear motion guide device in the first embodiment, the arc central angle Hp and the curvature radius r2p of the groove shoulder side sub-arc portion 23 and the arc central angle Hm and the curvature radius r2m of the groove bottom side sub-arc portion 25 satisfy the following condition A or condition B. That is, one of the groove shoulder side sub-arc portion 23 and the groove bottom side sub-arc portion 25 which has a larger arc central angle has a smaller curvature radius than the other one of them with a smaller arc central angle.

Figure 8:
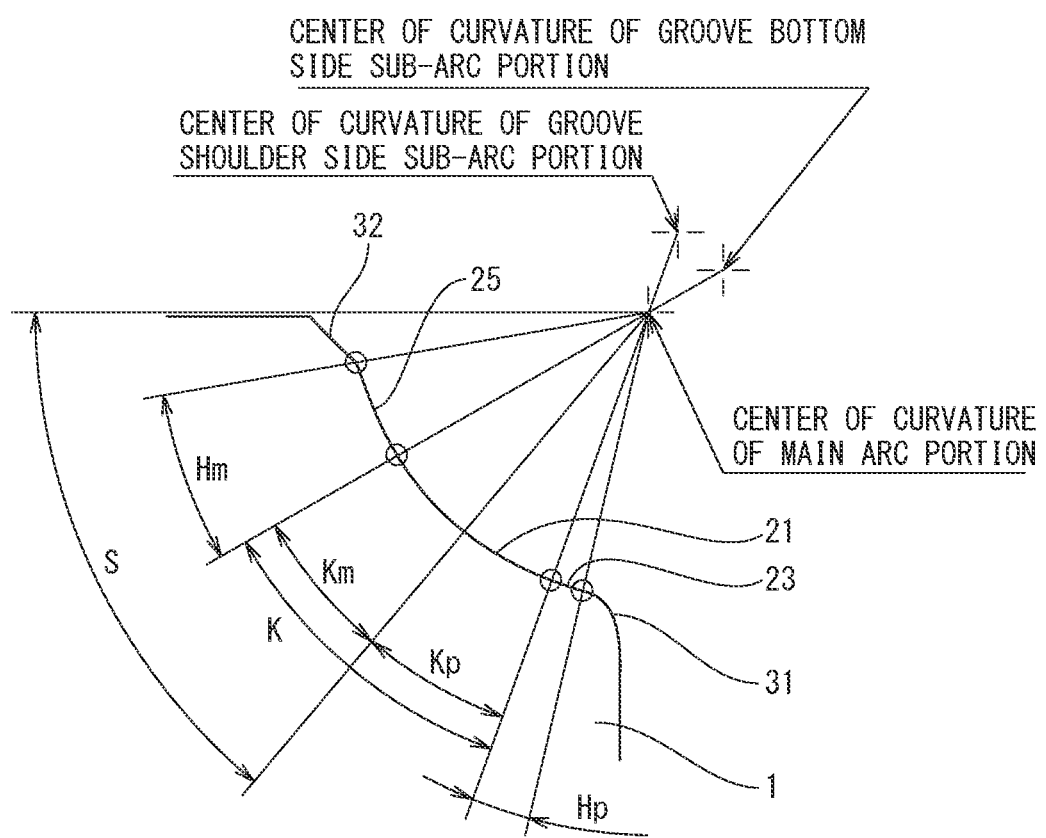
FIG. 8 is a view to describe a flank of a rail upper groove.

$Hp > Hm$ and $r2p < r2m$     Condition A:

$Hp < Hm$ and $r2p > r2m$     Condition B:

Next will be described the flank included in the rail upper groove 10 with reference to FIG. 8. The rail upper groove 10 is a groove including one flank, differently from the rail lower grooves 10 including two flanks 20U, 20L. The flank of the rail upper groove 10 includes a main arc portion 21 having an arc sectional shape and placed generally in a center of the flank in a width direction, a groove shoulder side sub-arc portion 23 having an arc sectional shape and formed continuously from a groove shoulder side (a side-face-la side of the guide rail 1) of the main arc portion 21, and a groove bottom side sub-arc portion 25 having an arc sectional shape and formed continuously from a groove bottom side (a top-face-1b side of the guide rail 1) of the main arc portion 21.

A chamfer 31 (R-chamfer) is formed in an edge portion of the rail upper groove 10 on the groove shoulder side, and a chamfer 32 (C-chamfer) is formed in an edge portion thereof on the groove bottom side. Note that types of the chamfers are not limited particularly, and the chamfer on the groove shoulder side may be a C-chamfer and the chamfer on the groove bottom side may be an R-chamfer.

Next will be described the main arc portion 21, the groove shoulder side sub-arc portion 23, and the groove bottom side sub-arc portion 25 included in the flank of the rail upper groove 10, with reference to FIG. 8. A sectional shape of the flank of the rail upper groove 10 is a combined-arc shape in which the groove shoulder side sub-arc portion 23, the main arc portion 21, and the groove bottom side sub-arc portion 25 are continuous with each other.

The main arc portion 21 is disposed in an equal range toward both sides of the flank in the width direction around a contact point between the ball 3 and the flank, and an arc central angle K of the main arc portion 21 is 40°, for example. A part of the main arc portion 21 on the groove shoulder side relative to the contact point and a part thereof on the groove bottom side relative to the contact point have an equal range in the width direction of the flank, and when an arc central angle of the part on the groove shoulder side relative to the contact point is assumed Kp and an arc central angle of the part on the groove bottom side relative to the contact point is assumed Km, Kp and Km are 20°, for example, in the first embodiment.

The groove shoulder side sub-arc portion 23 is formed between the main arc portion 21 and the chamfer 31 on a groove shoulder, and an arc central angle Hp of the groove shoulder side sub-arc portion 23 is 9.8°, for example, in the first embodiment. Further, the groove bottom side sub-arc portion 25 is formed between the main arc portion 21 and the chamfer 32 on the groove bottom side, and an arc central angle Hm of the groove bottom side sub-arc portion 25 is 18.6°, for example, in the first embodiment. That is, magnitudes of the arc central angles Hp, Hm of the groove shoulder side sub-arc portion 23 and the groove bottom side sub-arc portion 25 are limited by dimensions of the chamfers 31, 32 on the groove shoulder side and the groove bottom side.

A curvature radius r1 of the main arc portion 21 is the same as that of the upper flank 20U of the rail lower groove 10. Further, curvature radiuses r2p, r2m of the groove shoulder side sub-arc portion 23 and the groove bottom side sub-arc portion 25 are the same as those of the upper flank 20U of the rail lower groove 10, and are set to be slightly larger than the curvature radius r1 of the main arc portion 21 (that is, the curvature radius r2p of the groove shoulder side sub-arc portion 23 and the curvature radius r2m of the groove bottom side sub-arc portion 25 have different values).

Further, similarly to the rail lower groove 10, in a case of the rail upper groove 10, the arc central angle Hp and the curvature radius r2p of the groove shoulder side sub-arc portion 23 and the arc central angle Hm and the curvature radius r2m of the groove bottom side sub-arc portion 25 satisfy the above condition A or condition B.

The main arc portion 21 and the groove shoulder side sub-arc portion 23 are smoothly connected to each other so as to share a tangent at their connecting portion. Further, similarly, the main arc portion 21 and the groove bottom side sub-arc portion 25 are smoothly connected to each other so as to share a tangent at their connecting portion.

Figure 9:
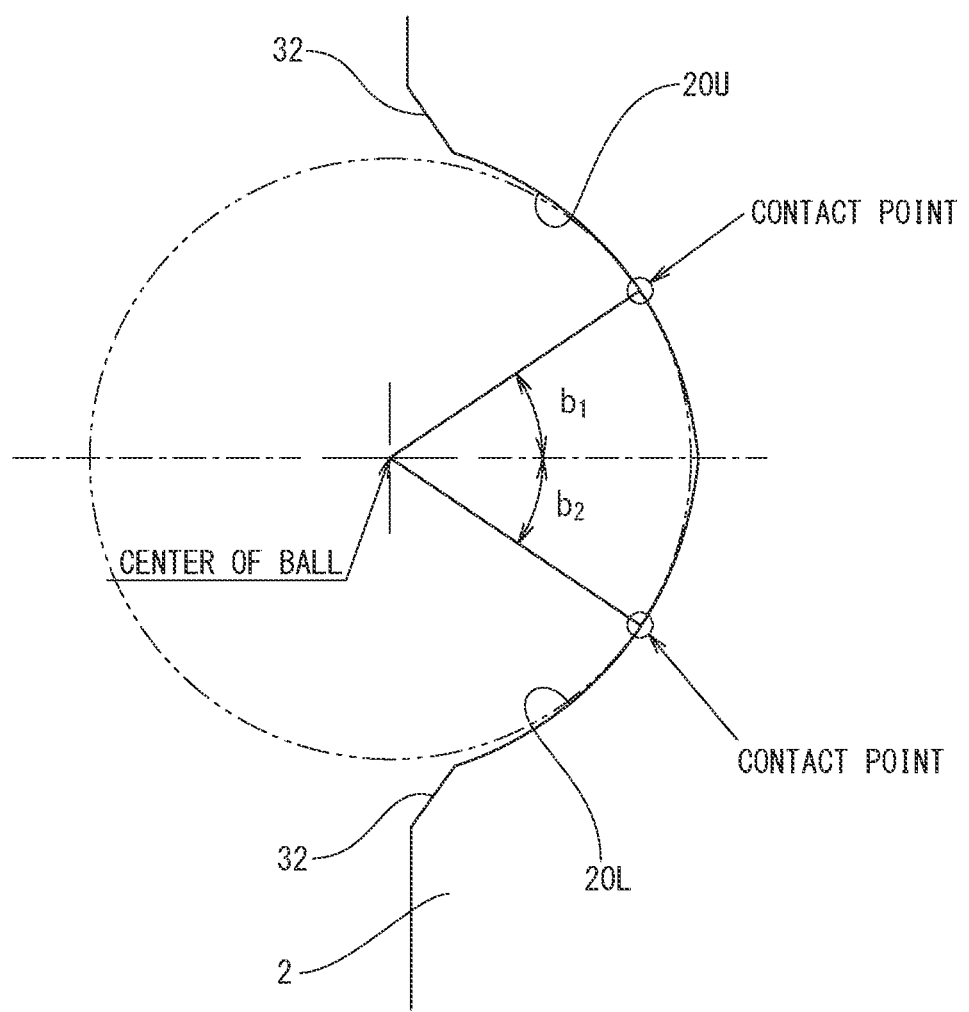
FIG. 9 is an enlarged view of a slider lower groove.
Figure 10:
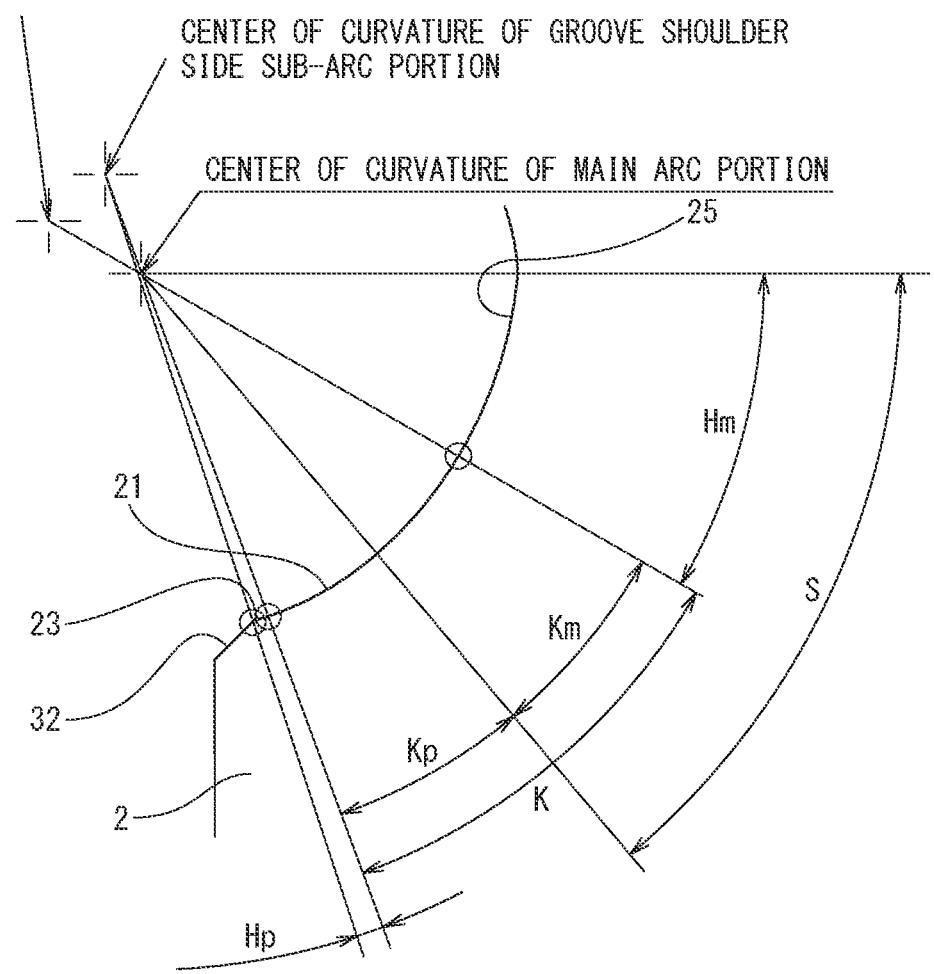
FIG. 10 is a view to describe a lower flank of the slider lower groove.

Next will be described the flanks included in the slider lower groove 11 with reference to FIGS. 9, 10. Note that a sectional shape of the slider upper groove 11 is the same as a sectional shape of the slider lower groove 11, so a description thereof is omitted.

The upper flank 20U and the lower flank 20L included in the slider lower groove 11 have sectional shapes forming a line symmetry in the up-down direction (that is, a sectional shape of the slider lower groove 11 is a line-symmetric shape), and each of the flanks 20U, 20L includes a main arc portion 21 having an arc sectional shape and placed generally in a center of the flank 20U, 20L in a width direction, a groove shoulder side sub-arc portion 23 having an arc sectional shape and formed continuously from a groove shoulder side of the main arc portion 21, and a groove bottom side sub-arc portion 25 having an arc sectional shape and formed continuously from a groove bottom side of the main arc portion 21.

When a position of the slider lower groove 11 is measured after the slider body 2A is manufactured, a ball for measurement is placed in the slider lower groove 11 so as to make contact with both the upper flank 20U and the lower flank 20L. Since the slider lower groove 11 includes two flanks 20U, 20L, a position of the ball for measurement is more stable than a case where only one flank is provided. Accordingly, it is possible to highly precisely measure a height position of the slider lower groove 11 and a distance, in the width direction, of the guide rail 1 between two slider lower grooves 11, 11. In terms of contact angles of the ball for measurement, a contact angle b1 at the upper flank 20U can be 36°, and a contact angle b2 at the lower flank 20L can be 36° (see FIG. 9).

Chamfers (C-chamfers) 32 to be connected to a land portion are formed in both edge portions on the groove shoulder sides of the slider lower groove 11. The chamfers 32 can prevent burrs from remaining in the edge portions of the slider lower groove 11 on the groove shoulder sides. In the first embodiment, two chamfers 32 have the same depth. Note that the type of the chamfer is also not limited to the C-chamfer, but may be an R-chamfer.

Next will be described the main arc portions 21, the groove shoulder side sub-arc portions 23, and the groove bottom side sub-arc portions 25 included in the upper flank 20U and the lower flank 20L of the slider lower groove 11 by taking the lower flank 20L of the slider lower groove 11 as an example, with reference to FIG. 10. A sectional shape of the lower flank 20L of the slider lower groove 11 is a combined-arc shape in which the groove shoulder side sub-arc portion 23, the main arc portion 21, and the groove bottom side sub-arc portion 25 are continuous with each other.

The main arc portion 21 is disposed in an equal range toward both sides of the lower flank 20L in the width direction around a contact point between the ball 3 and the lower flank 20L, and an arc central angle K of the main arc portion 21 is 40°, for example. A part of the main arc portion 21 on the groove shoulder side relative to the contact point and a part thereof on the groove bottom side relative to the contact point have an equal range in the width direction of the lower flank 20L, and when an arc central angle of the part on the groove shoulder side relative to the contact point is assumed Kp and an arc central angle of the part on the groove bottom side relative to the contact point is assumed Km, Kp and Km are 20°, for example, in the first embodiment.

The groove shoulder side sub-arc portion 23 is formed between the main arc portion 21 and the chamfer 32 on a groove shoulder, and an arc central angle Hp of the groove shoulder side sub-arc portion 23 is 7.5°, for example, in the first embodiment. Further, the groove bottom side sub-arc portion 25 is formed between the main arc portion 21 and a groove bottom (a connecting portion between the upper flank 20U and the lower flank 20L), and an arc central angle Hm of the groove bottom side sub-arc portion 25 is 30.0°, for example, in the first embodiment. That is, a magnitude of the arc central angle Hp of the groove shoulder side sub-arc portion 23 is limited by a dimension of the chamfer 32 on the groove shoulder side.

When a range of the main arc portion 21 is too large (when the arc central angle K is too large), the ranges of the groove shoulder side sub-arc portion 23 and the groove bottom side sub-arc portion 25 are narrowed (the arc central angles Hp, Hm are decreased), and design freedom of the groove shoulder side sub-arc portion 23 and the groove bottom side sub-arc portion 25 is decreased. In the meantime, when the range of the main arc portion 21 is too small (when the arc central angle K is too small), areas of the groove shoulder side sub-arc portion 23 and the groove bottom side sub-arc portion 25 are increased, so that a contact surface pressure is easily increased at the time when a load is applied. On this account, it is preferable that the arc central angle K of the main arc portion 21 be 40°.

A curvature radius r1 of the main arc portion 21 is the same as that of the upper flank 20U of the rail lower groove 10. Further, a curvature radius r2p of the groove shoulder side sub-arc portion 23 and a curvature radius r2m of the groove bottom side sub-arc portion 25 are the same as those of the upper flank 20U of the rail lower groove 10, and are set to be slightly larger than the curvature radius r1 of the main arc portion 21 (that is, the curvature radius r2p of the groove shoulder side sub-arc portion 23 and the curvature radius r2m of the groove bottom side sub-arc portion 25 have different values).

Further, similarly to the rail upper groove 10 and the rail lower groove 10, in a case of the slider lower groove 11, the arc central angle Hp and the curvature radius r2p of the groove shoulder side sub-arc portion 23 and the arc central angle Hm and the curvature radius r2m of the groove bottom side sub-arc portion 25 satisfy the above condition A or condition B.

The main arc portion 21 and the groove shoulder side sub-arc portion 23 are smoothly connected to each other so as to share a tangent at their connecting portion. Further, similarly, the main arc portion 21 and the groove bottom side sub-arc portion 25 are smoothly connected to each other so as to share a tangent at their connecting portion.

By smoothly connecting the main arc portion 21 to the groove shoulder side sub-arc portion 23 and to the groove bottom side sub-arc portion 25 as such, it is possible to prevent a sudden change in distribution of a contact surface pressure at the connecting portions and to restrain a decrease of the life of the linear motion guide device. Further, the upper flank 20U and the lower flank 20L of the raceway grooves 10, 11 opposed to each other have the same sectional shape, so that the sectional shapes of the upper flank 20U and the lower flank 20L can be easily measured and managed.

The linear motion guide device includes eight raceway grooves 10, 11 including the rail upper grooves 10, the rail lower grooves 10, the slider upper grooves 11, and the slider lower grooves 11, but all flanks that make contact with the ball 3 among all the flanks included in these eight raceway grooves 10, 11 are configured such that their main arc portions 21 have the same curvature radius r1, their groove shoulder side sub-arc portions 23 have the same curvature radius r2p, and their groove bottom side sub-arc portions 25 have the same curvature radius r2m.

Further, it is the upper flank 20U of the slider upper groove 11, for example, that has a smallest arc central angle Hp of the groove shoulder side sub-arc portion 23, among all the flanks that make contact with the ball 3 among all the flanks included in these eight raceway grooves 10, 11. A minimum value Hpmin of the arc central angle Hp of the groove shoulder side sub-arc portion 23, that is, an arc central angle Hpmin of one of the groove shoulder side sub-arc portions 23 included in all the main flanks, which has a smallest range is 7.5°, for example.

Similarly, it is the upper flank 20U of the slider lower groove 10, for example, that has a smallest arc central angle Hm of the groove bottom side sub-arc portion 25 among all the flanks that make contact with the ball 3 among all the flanks included in the eight raceway grooves 10, 11. A minimum value Hpmin of the arc central angle Hm of the groove bottom side sub-arc portion 25, that is, an arc central angle Hpmin of one of the groove bottom side sub-arc portions 25 included in all the main flanks which has a smallest range is 10.0°, for example.

In the linear motion guide device of the first embodiment, the minimum value Hpmin of the arc central angle Hp of the groove shoulder side sub-arc portion 23, the curvature radius r2p of the groove shoulder side sub-arc portion 23, the minimum value Hpmin of the arc central angle Hm of the groove bottom side sub-arc portion 25, and the curvature radius r2m of the groove bottom side sub-arc portion 25 satisfy the following condition C or condition D.

Condition C: $Hp\text{min} > Hm\text{min}$ and $r2p < r2m$

Condition D: $Hp\text{min} < Hm\text{min}$ and $r2p > r2m$

Figure 11:
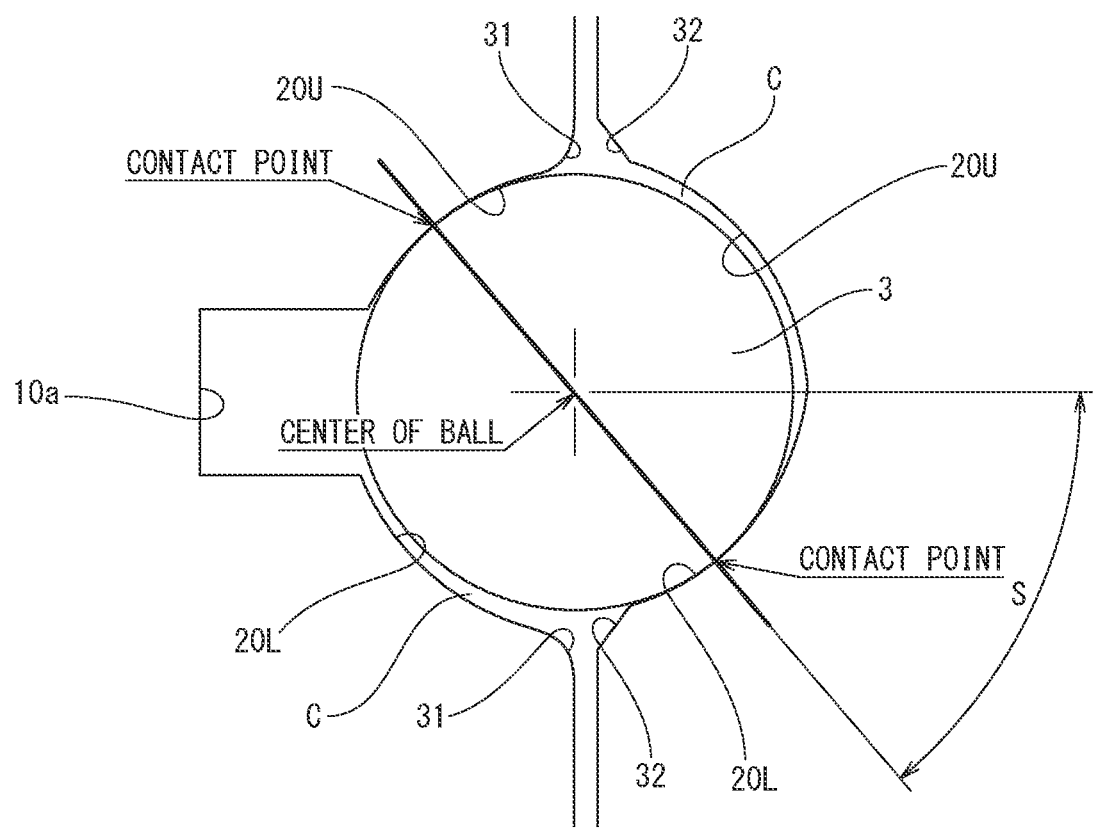
FIG. 11 is a view to describe the rail lower groove and the slider lower groove at the use of the linear motion guide device.
Figure 12:
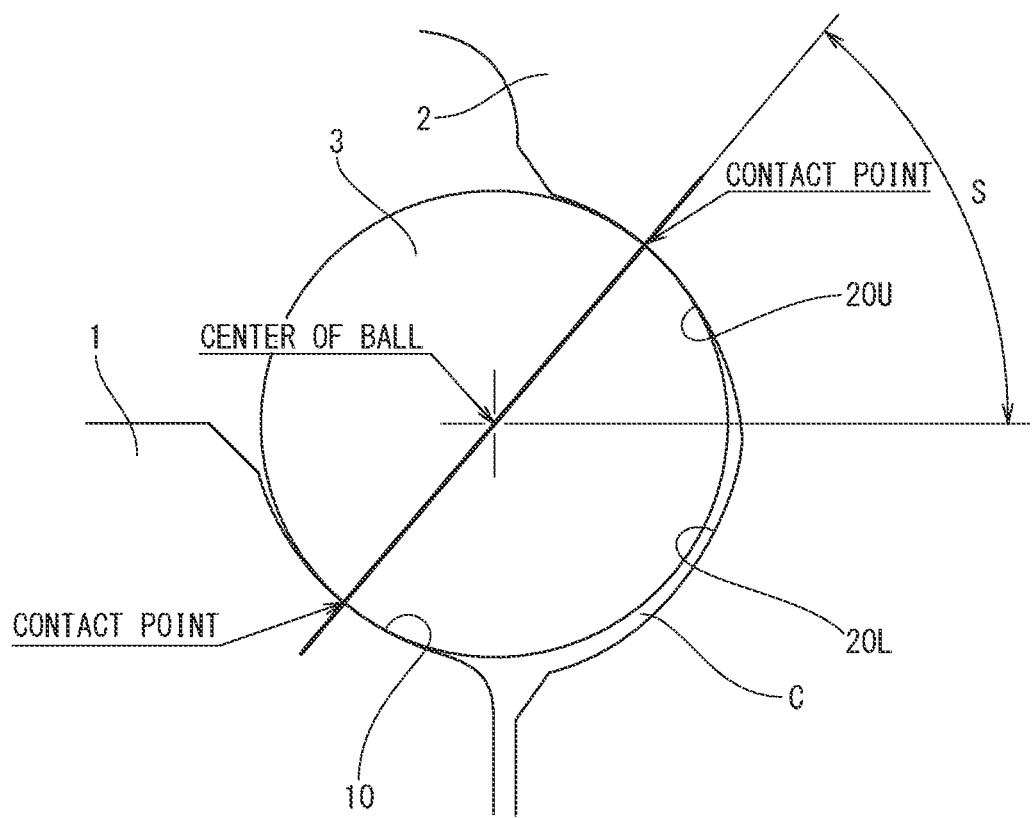
FIG. 12 is a view to describe the rail upper groove and a slider upper groove at the use of the linear motion guide device.

Next will be described the rail lower groove 10 and the slider lower groove 11 at the use of the linear motion guide device. At the use of the linear motion guide device, height positions of the rail lower groove 10 and the slider lower groove 11 are not the same, but differ from each other as can be seen from FIG. 11. On this account, contact states of the rail lower groove 10 and the slider lower groove 11 with the ball 3 are different between the time of the use of the linear motion guide device and the time of the measurement of the positions of the slider lower groove 11.

At the use of the linear motion guide device, the upper flank 20U of the rail lower groove 10 and the lower flank 20L of the slider lower groove 11 make contact with the ball 3. That is, the upper flank 20U of the rail lower groove 10 and the lower flank 20L of the slider lower groove 11 are main flanks, and the lower flank 20L of the rail lower groove 10 and the upper flank 20U of the slider lower groove 11 are sub-flanks. Further, a contact angle S is 50°, for example, and the contact angle of 50° is different from the aforementioned contact angle a1 and contact angle b2.

Further, in terms of the rail upper groove 10 and the slider upper groove 11 at the use of the linear motion guide device, the flank of the rail upper groove 10 and the upper flank 20U of the slider upper groove 11 make contact with the ball 3, and a contact angle S thereof is not less than 15° but not more than 75°.

In the linear motion guide device of the first embodiment, configured as described above, the sectional shapes of the raceway grooves 10, 11 are not linearly symmetric but asymmetric across a line of action of a load applied at the contact points between the raceway grooves 10, 11 and the ball 3, the line of action of the load being taken as an axis of symmetry, and even when any of a pressing load, a tensile load, and a lateral load is applied to the slider, a contact surface pressure between the ball 3 and the raceway grooves 10, 11 is reduced, so that an edge load can hardly occur.

Note that the main flank that receives a load and the sub-flank that does not receive a load (the upper flanks 20U and the lower flanks 20L of the rail lower groove 10, the slider upper groove 11, the slider lower groove 11) have sectional shapes that form a line symmetry in the up-down direction, but may have asymmetric sectional shapes. Further, the raceway grooves 10 included in the guide rail 1 and the raceway grooves 11 included in the slider 2 may all have the same sectional shape. This makes it possible to easily measure and manage the sectional shapes of the flanks of the raceway grooves 10, 11.

Note that the raceway grooves 10 included in the guide rail 1 and the raceway grooves 11 included in the slider 2 may have different sectional shapes. Further, the sub-flanks have little worry about an edge load, so their sectional shapes may be a single arc shape, instead of a combined-arc shape. A raceway groove including a flank having a single-arc sectional shape is more easily manufactured than a raceway groove including a flank having a combined-arc sectional shape.

Example of First Embodiment

Distribution of a contact surface pressure between a ball and a main flank of a raceway groove when a load is applied to a linear motion guide device having generally the same configuration as the linear motion guide device of the first embodiment was found by calculation (Example 1). A specification of the linear motion guide device used for the calculation is as follows.

Width of Guide Rail: 28 mm
Number of Balls: 9
Diameter of Ball: 5.556 mm
Curvature Radius r1 of Main Arc Portion: 2.834 mm (0.51 times as large as a diameter of a ball)
Arc Central Angle K of Main Arc Portion: 40° (Kp=Km=20°)
Curvature Radius r2p of Groove Shoulder Side Sub-arc Portion: 3.223 mm (0.58 times as large as the diameter of the ball)
Curvature Radius r2m of Groove Bottom Side Sub-arc portion: 3.000 mm (0.54 times as large as the diameter of the ball)
Arc Central Angle Hp of Groove Shoulder Side Sub-arc Portion: 9.8° for Guide Rail Side, 7.5° for Slider Side
Arc Central Angle Hm of Groove Bottom Side Sub-arc Portion: 10.0° for Guide Rail Side, 30.0° for Slider Side
Minimum Value Hpmin of Arc Central Angle Hp of Groove Shoulder Side Sub-arc Portion: 7.5°
Minimum Value Hmmin of Arc Central Angle Hm of Groove Bottom Side Sub-arc Portion: 10.0°

Note that respective values of the curvature radius r1 and the arc central angle K of the main arc portion, and the curvature radiuses r2p, r2m of the groove shoulder side sub-arc portion and the groove bottom side sub-arc portion are specifications common to the guide rail and the slider. Further, in terms of each of the raceway grooves except for a rail upper groove, the main flank and a sub-flank have sectional shapes forming a line symmetry in the up-down direction.

First of all, when a tensile load of 15000 N is applied to the slider, the slider moves upward, so the contact angle changes from 50° to 60°. A load received by one ball is approximately 960 N at this time.

Second, when a lateral load of 10000 N is applied to the slider, the slider moves in the width direction of the guide rail, so the contact angle changes from 50° to 38°. A load received by one ball is approximately 700 N at this time.

Figure 13:
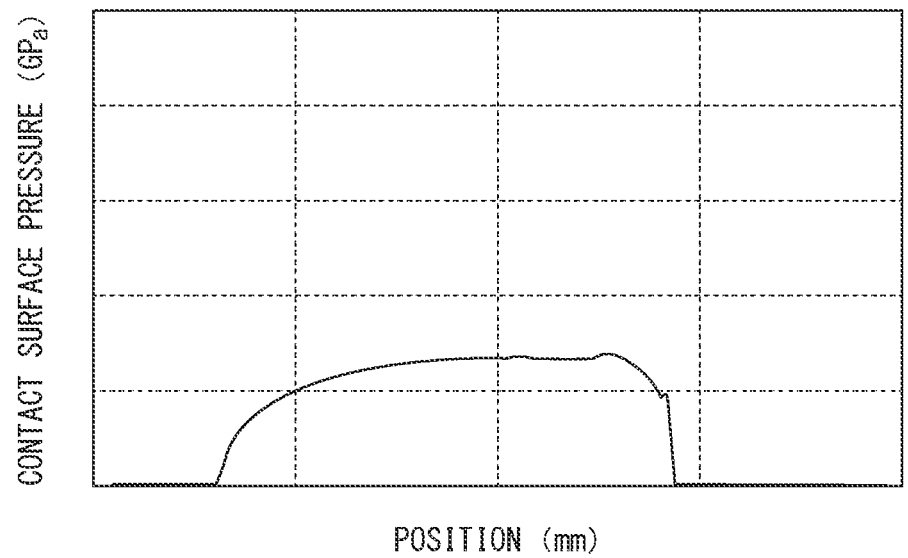
FIG. 13 is a graph illustrating distribution of a contact surface pressure at the time when a tensile load is applied in Example 1.
Figure 14:
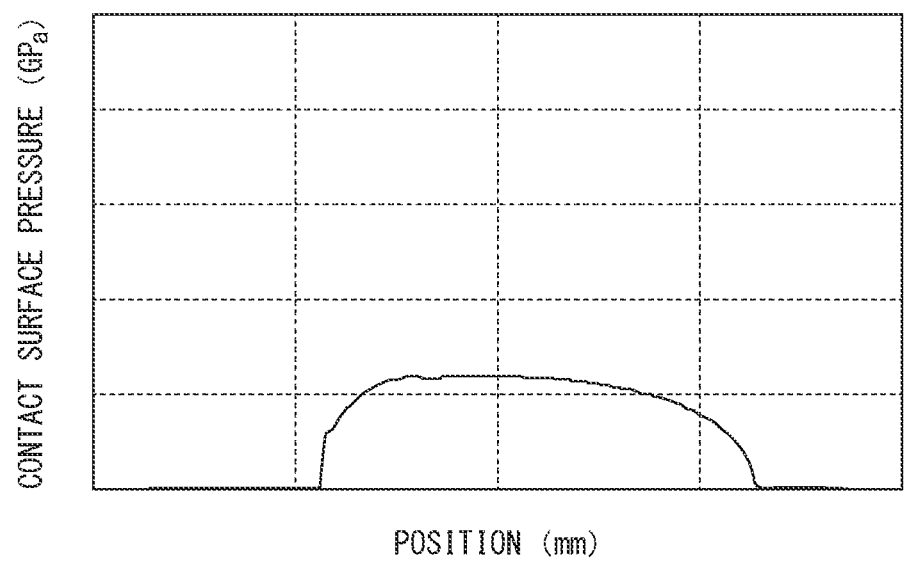
FIG. 14 is a graph illustrating distribution of a contact surface pressure at the time when a lateral load is applied in Example 1.

In terms of these two cases, distribution of a contact surface pressure was calculated by use of a computer program based on an elastic contact theory. A calculation result when the tensile load is applied is illustrated in the graph of FIG. 13, and a calculation result when the lateral load is applied is illustrated in the graph of FIG. 14. A horizontal axis in each of the graph indicates a position on a contact ellipse, and a right side of each of the graph corresponds to the groove shoulder side, a left side thereof corresponds to the groove bottom side.

When the tensile load is applied, the contact angle is large, thereby resulting in that an edge load easily occurs on the groove shoulder side. In the specification of the linear motion guide device of Example 1, the edge load easily occurs on a slider side (a raceway groove with Hp=Hpmin) where the arc central angle Hp of the groove shoulder side sub-arc portion is small. However, according to Example 1, it is found, from the graph of FIG. 13, that the occurrence of the edge load is restrained by the groove shoulder side sub-arc portion and only very few edge loads occur.

Further, when the lateral load is applied, the contact angle is small, thereby resulting in that an edge load easily occurs on the groove bottom side. In the specification of the linear motion guide device of Example 1, the edge load easily occurs on a rail side (a raceway groove with Hm=Hmmin) where the arc central angle Hm of the groove bottom side sub-arc portion is small. However, according to Example 1, it is found, from the graph of FIG. 14, that the occurrence of the edge load is restrained by the groove bottom side sub-arc portion and only very few edge loads occur.

Subsequently, distribution of a contact surface pressure between a ball and a main flank of a raceway groove when a load was applied to a linear motion guide device of a comparative example was found by calculation similarly to Example 1 (Comparative Examples 1, 2). A specification of the linear motion guide device of Comparative Example 1, used for the calculation, is as follows.

Curvature Radius r2p of Groove Shoulder Side Sub-arc portion: 3.223 mm (0.58 times as large as the diameter of the ball)

Curvature Radius r2m of Groove Bottom Side Sub-arc Portion: 3.223 mm (0.58 times as large as the diameter of the ball)

Further, a specification of the linear motion guide device of Comparative Example 2, used for the calculation, is as follows.

Curvature Radius r2p of Groove Shoulder Side Sub-arc Portion: 3.000 mm (0.54 times as large as the diameter of the ball)

Curvature Radius r2m of Groove Bottom Side Sub-arc Portion: 3.000 mm (0.54 times as large as the diameter of the ball)

That is, in both of Comparative Examples 1, 2, the curvature radius r2p of the groove shoulder side sub-arc portion and the curvature radius r2m of the groove bottom side sub-arc portion have the same value. Specifications except for those points are similar to the linear motion guide device of Example 1.

Figure 15:
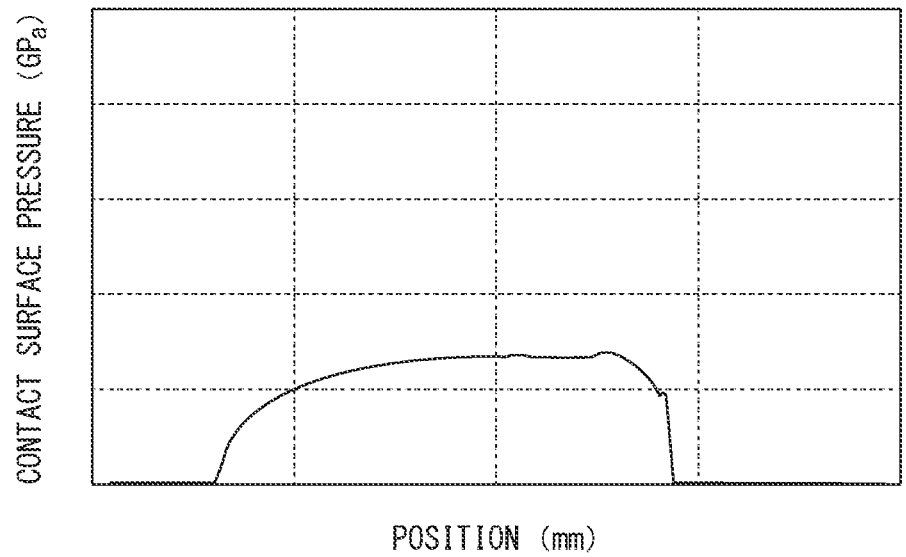
FIG. 15 is a graph illustrating distribution of a contact surface pressure at the time when a tensile load is applied in Comparative Example 1.
Figure 16:
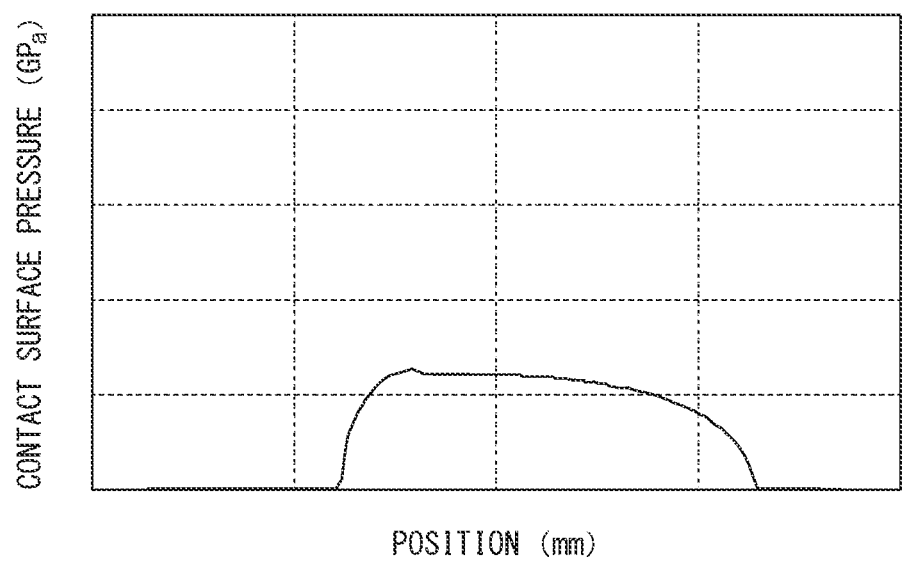
FIG. 16 is a graph illustrating distribution of a contact surface pressure at the time when a lateral load is applied in Comparative Example 1.

In terms of Comparative Example 1, a calculation result when a tensile load is applied is illustrated in a graph of FIG. 15, and a calculation result when a lateral load is applied is illustrated in a graph of FIG. 16. A horizontal axis in each of the graphs indicates a position on a contact ellipse, and a right side of each of the graphs corresponds to the groove shoulder side, a left side thereof corresponds to the groove bottom side.

When the tensile load is applied, it is found, from the graph of FIG. 15, that occurrence of an edge load is restrained by the groove shoulder side sub-arc portion and only very few edge loads occur. Further, when the lateral load is applied, it is also found, from the graph of FIG. 16, that occurrence of an edge load is restrained by the groove bottom side sub-arc portion.

However, the curvature radius r2m of the groove bottom side sub-arc portion is larger than Example 1, so a contact surface pressure is larger than Example 1. More specifically, a maximum contact surface pressure is 2.3 GPa in Example 1, but it is increased to 2.5 GPa in Comparative Example 1. Such an increase of the contact surface pressure is unfavorable because it leads to a decrease of a life of the linear motion guide device.

Thus, in Comparative Example 1, a reduction effect of the contact surface pressure like Example 1 cannot be expected. That is, depending on a direction and a magnitude of a load to be applied to the slider, the life of the linear motion guide device might decrease.

Figure 17:
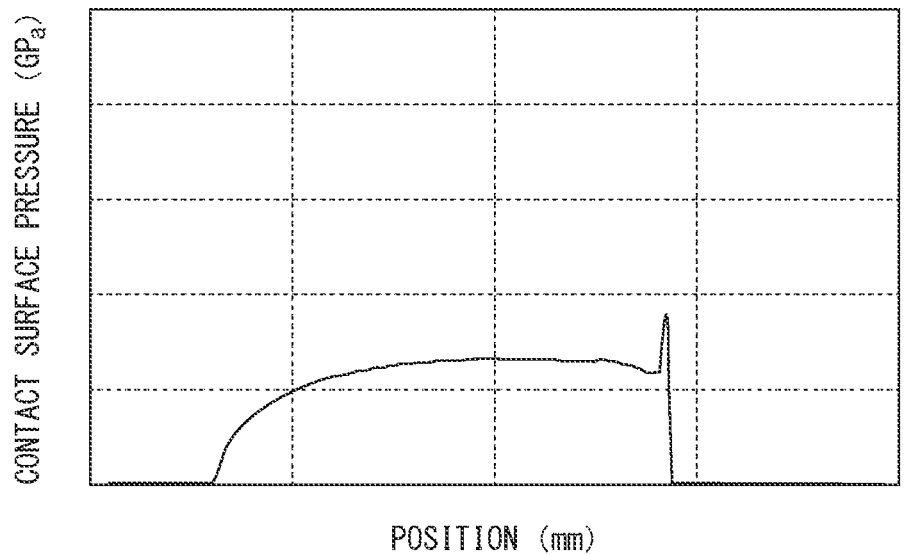
FIG. 17 is a graph illustrating distribution of a contact surface pressure at the time when a tensile load is applied in Comparative Example 2.
Figure 18:
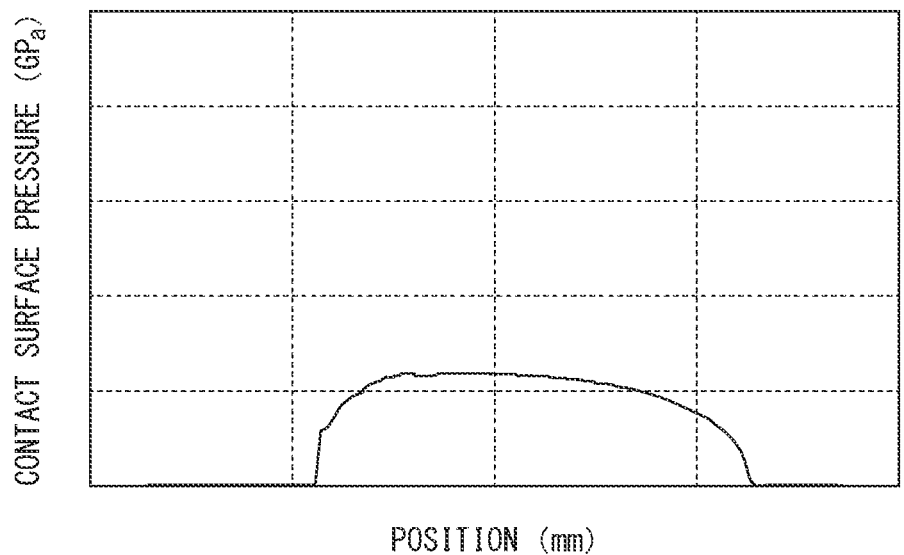
FIG. 18 is a graph illustrating distribution of a contact surface pressure at the time when a lateral load is applied in Comparative Example 2.

In Comparative Example 2, a calculation result when a tensile load is applied is illustrated in a graph of FIG. 17, and a calculation result when a lateral load is applied is illustrated in a graph of FIG. 18. A horizontal axis in each of the graphs indicates a position on a contact ellipse, and a right side of each of the graphs corresponds to the groove shoulder side, a left side thereof corresponds to the groove bottom side.

When the lateral load is applied, it is found, from the graph of FIG. 18, that occurrence of an edge load is restrained by the groove shoulder side sub-arc portion and only very few edge loads occur. However, when the tensile load is applied, it is found, from the graph of FIG. 17, that an edge load occurs more markedly than Example 1 and Comparative Example 1.

Thus, in Comparative Example 2, a reduction effect of the contact surface pressure like Example 1 cannot be expected. That is, depending on a direction and a magnitude of a load to be applied to the slider, the life of the linear motion guide device might decrease or plastic deformation might occur in the raceway groove.

Subsequently, optimum values of the curvature radiuses r2p, r2m of the groove shoulder side sub-arc portion and the groove bottom side sub-arc portion were examined. Since the arc central angles Hp, Hm of the groove shoulder side sub-arc portion and the groove bottom side sub-arc portion change due to dimensions of the chamfer on the groove shoulder of the raceway groove and the cage clearance groove (the wire groove) on the groove bottom, the optimum values of the curvature radiuses r2p, r2m of the groove shoulder side sub-arc portion and the groove bottom side sub-arc portion change depending on magnitudes of the arc central angles Hp, Hm. In the linear motion guide device of Example 1, the arc central angle Hp of the groove shoulder side sub-arc portion was set to 8° and the curvature radius r2p (a ratio to the diameter of the ball) of the groove shoulder side sub-arc portion was variously changed so as to find distribution of a contact surface pressure between the ball and the main flank by calculation similarly to Example 1. At this time, a load to be applied to the slider was a tensile load of 15000N.

Figure 19:
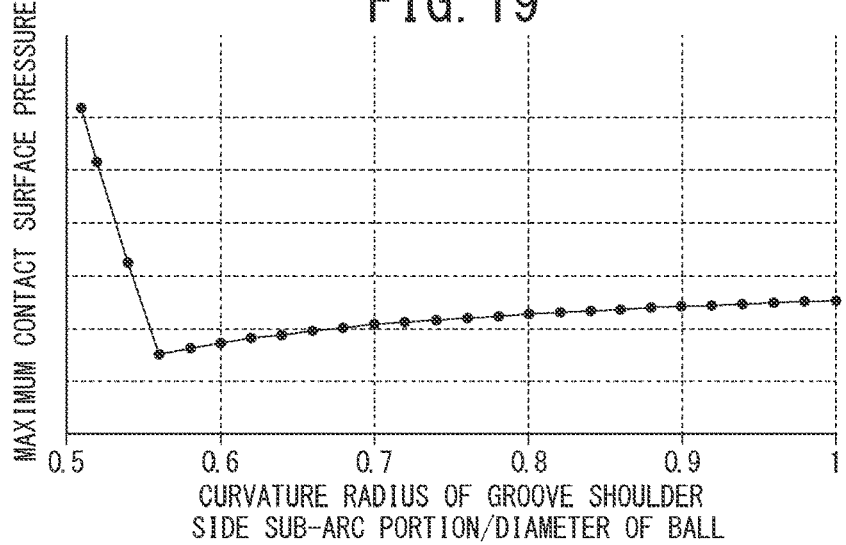
FIG. 19 is a graph illustrating a relationship between a ratio of a curvature radius r2p of a groove shoulder side sub-arc portion to a diameter of a ball and a maximum contact surface pressure.

A relationship between a ratio ([curvature radius r2p of groove shoulder side sub-arc portion]/[diameter of ball]) of the curvature radius r2p of the groove shoulder side sub-arc portion to the diameter of the ball and a maximum contact surface pressure is illustrated in a graph of FIG. 19. From this result, it is found that, in a case where the arc central angle Hp of the groove shoulder side sub-arc portion is 8°, when the ratio of the curvature radius r2p of the groove shoulder side sub-arc portion to the diameter of the ball is about 0.56, the contact surface pressure can be minimized.

Figure 20:
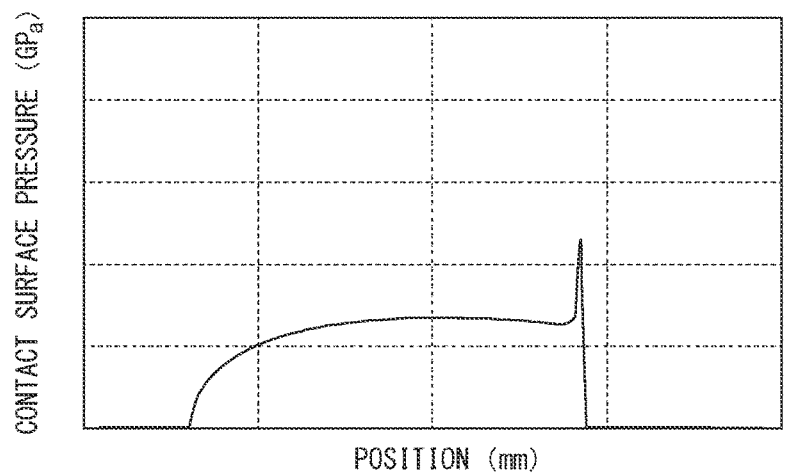
FIG. 20 is a graph illustrating distribution of a contact surface pressure in a case where the ratio of the curvature radius r2p of the groove shoulder side sub-arc portion to the diameter of the ball is 0.52.

Further, distribution of a contact surface pressure in a case where the ratio of the curvature radius r2p of the groove shoulder side sub-arc portion to the diameter of the ball is 0.52 is illustrated in a graph of FIG. 20. A horizontal axis in the graph indicates a position on a contact ellipse, and a right side of the graphs corresponds to the groove shoulder side and a left side thereof corresponds to the groove bottom side. It is found, from the graph of FIG. 20, that an edge load occurred on the groove shoulder side.

Figure 21:
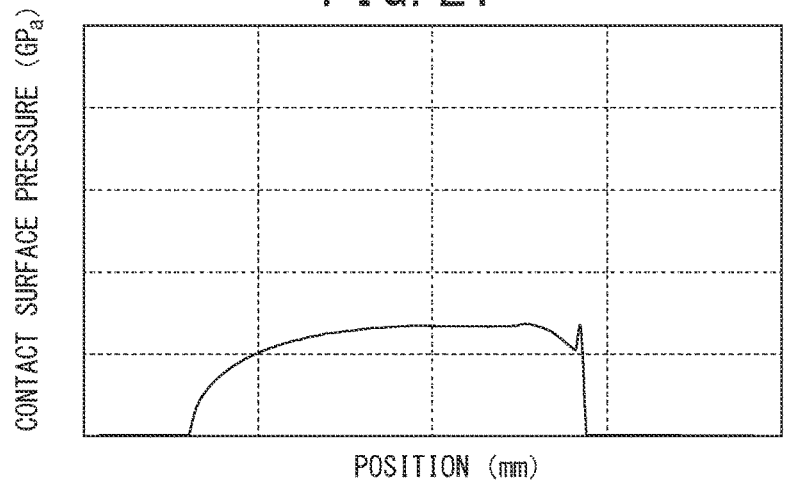
FIG. 21 is a graph illustrating distribution of a contact surface pressure in a case where the ratio of the curvature radius r2p of the groove shoulder side sub-arc portion to the diameter of the ball is 0.56.

Further, distribution of a contact surface pressure in a case where the ratio of the curvature radius r2p of the groove shoulder side sub-arc portion to the diameter of the ball is 0.56 is illustrated in a graph of FIG. 21. It is found, from the graph of FIG. 21, that an edge load hardly occurs and the contact surface pressure is low as a whole.

Figure 22:
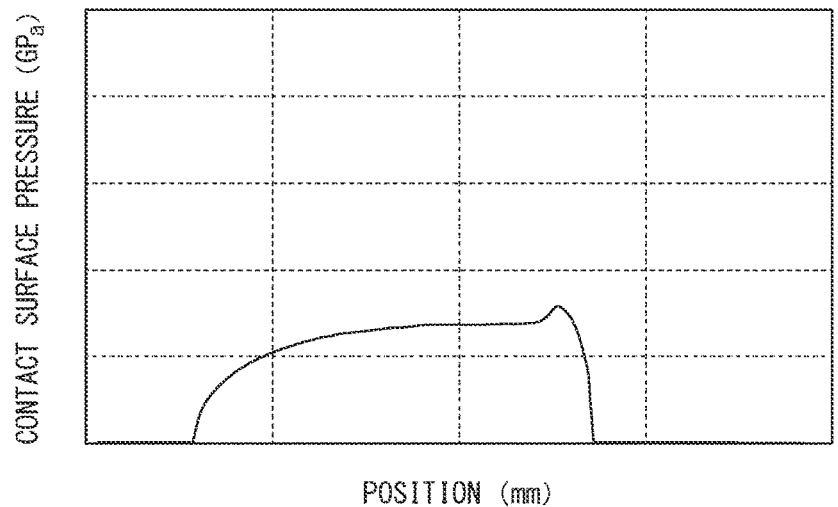
FIG. 22 is a graph illustrating distribution of a contact surface pressure in a case where the ratio of the curvature radius r2p of the groove shoulder side sub-arc portion to the diameter of the ball is 0.9.

Further, distribution of a contact surface pressure in a case where the ratio of the curvature radius r2p of the groove shoulder side sub-arc portion to the diameter of the ball is 0.9 is illustrated in a graph of FIG. 22. From the graph of FIG. 22, it is found that, although a remarkable edge load does not occur, the contact surface pressure is high over all, and there is a problem in the distribution of the contact surface pressure as compared with a case where the ratio of the curvature radius r2p of the groove shoulder side sub-arc portion to the diameter of the ball is 0.56.

From these results, in a case where the arc central angle Hp of the groove shoulder side sub-arc portion is 8°, it is optimum for the ratio of the curvature radius r2p of the groove shoulder side sub-arc portion to the diameter of the ball to be set to 0.56.

Similar examination was conducted by variously changing the arc central angle Hp of the groove shoulder side sub-arc portion. A result thereof is illustrated in a graph of FIG. 23. A horizontal axis of the graph of FIG. 23 indicates a magnitude of the arc central angle Hp of the groove shoulder side sub-arc portion, and a vertical axis indicates a ratio of the curvature radius r2p of the groove shoulder side sub-arc portion to the diameter of the ball at the time when an optimum distribution of the contact surface pressure is given.

Figure 23:
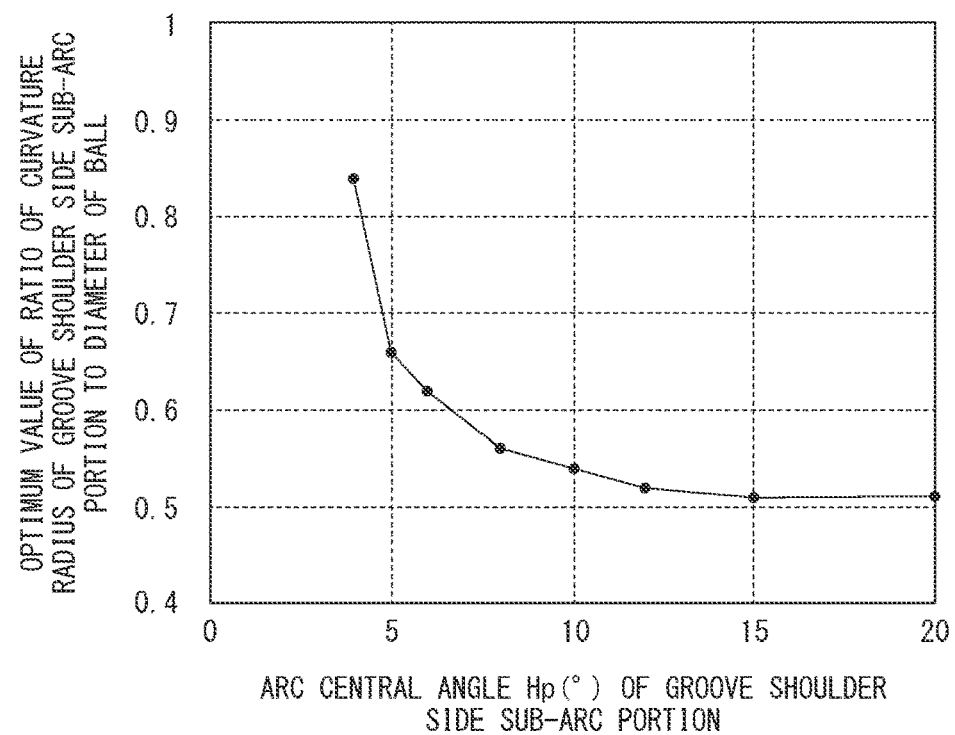
FIG. 23 is a graph illustrating a relationship between an arc central angle Hp of the groove shoulder side sub-arc portion and an optimum value of the ratio of the curvature radius r2p of the groove shoulder side sub-arc portion to the diameter of the ball.

From the graph of FIG. 23, it is found that, in a case where the arc central angle Hp of the groove shoulder side sub-arc portion is not less than 4° but less than 6°, when the ratio of the curvature radius r2p of the groove shoulder side sub-arc portion to the diameter of the ball is more than 0.62, an occurrence of an edge load and an increase of the contact surface pressure can be restrained. Further, it is found that, in a case where the arc central angle Hp of the groove shoulder side sub-arc portion is not less than 6° but less than 10°, the ratio of the curvature radius r2p of the groove shoulder side sub-arc portion to the diameter of the ball should be set to more than 0.54 but not more than 0.62, and in a case where the arc central angle Hp of the groove shoulder side sub-arc portion is not less than 10°, the ratio of the curvature radius r2p of the groove shoulder side sub-arc portion to the diameter of the ball should be set to not more than 0.54.

These results are examination results on the groove shoulder side sub-arc portion, but similar results were also provided about the groove bottom side sub-arc portion.

From these results, it is also found that at least one of the curvature radius r2p of the groove shoulder side sub-arc portion and the curvature radius r2m of the groove bottom side sub-arc portion may be allowed to be set to the same as the curvature radius r1 of the main arc portion. In a case where at least one of the curvature radius r2p of the groove shoulder side sub-arc portion and the curvature radius r2m of the groove bottom side sub-arc portion is set to be equal to the curvature radius r1 of the main arc portion, the sub-arc portion having the same curvature radius as the main arc portion is the same arc as the main arc portion. On this account, a sectional shape of its flank is not a combined-arc shape but a single arc shape in terms of a part where the sub-arc portion having the same curvature radius as the main arc portion is continuous with the main arc portion.

Second Embodiment

Figure 24:
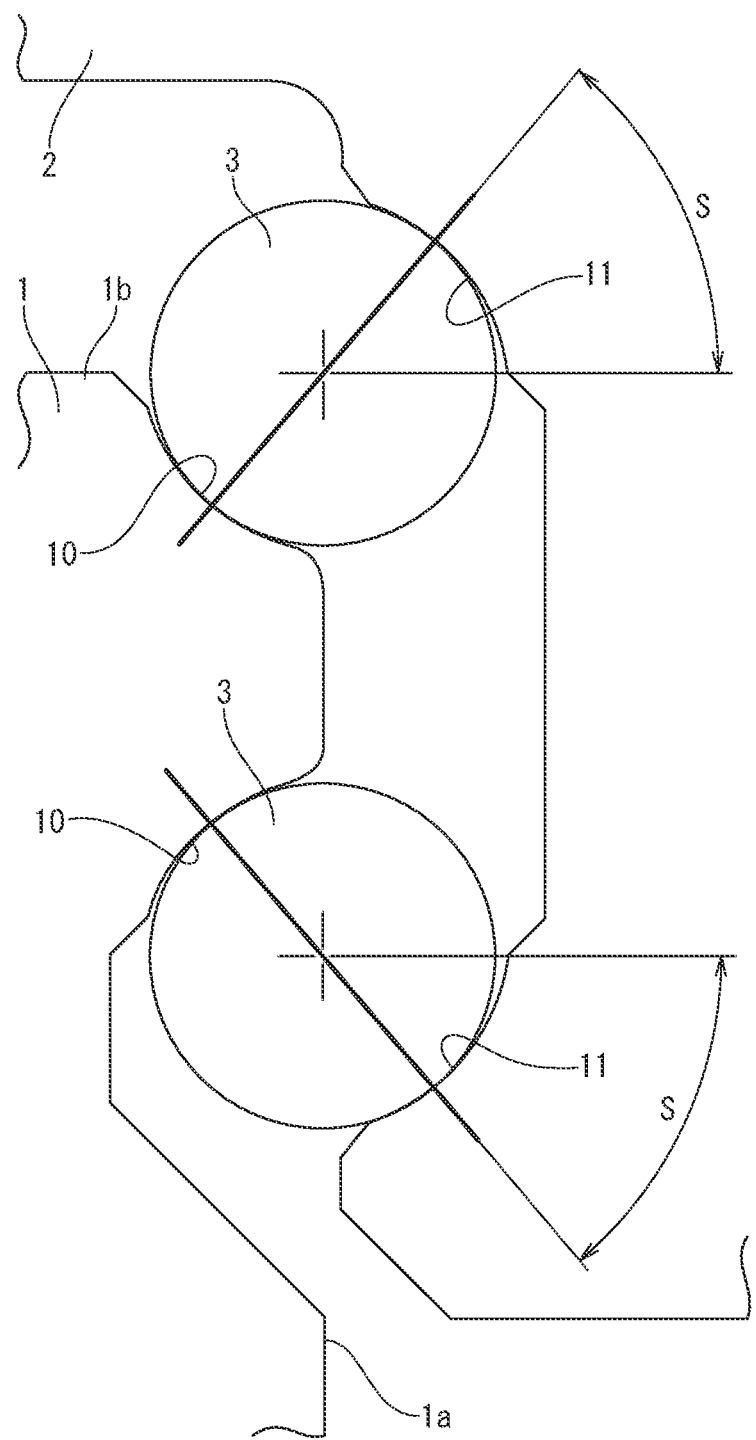
FIG. 24 is a view illustrating a structure of a linear motion guide device according to a second embodiment of the present invention and an enlarged view illustrating an essential part in an enlarged manner.
Figure 25:
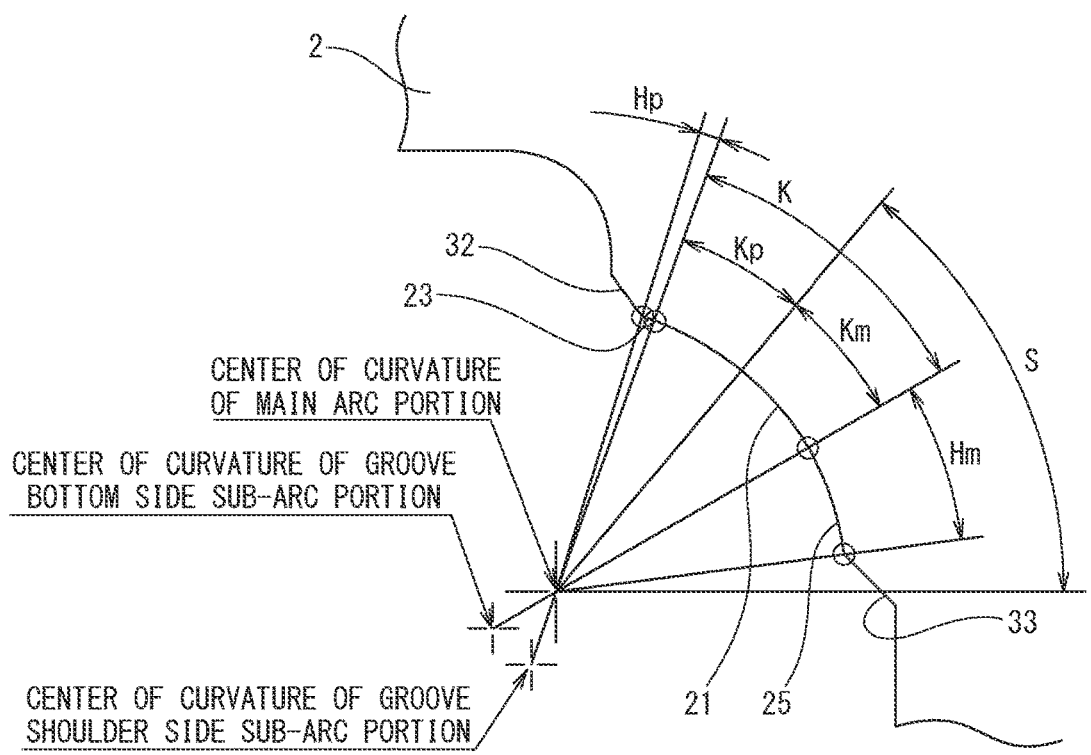
FIG. 25 is a view to describe a flank of a slider upper groove of the linear motion guide device according to the second embodiment.

A linear motion guide device according to a second embodiment of the present invention will be described with reference to FIGS. 24, 25. However, a configuration and an effect of the linear motion guide device of the second embodiment are generally the same as those of the first embodiment, so only different parts are described while descriptions of similar parts are omitted.

In the first embodiment, the rail lower groove 10, the slider upper groove 11, and the slider lower groove 11 are gothic-arc grooves having a generally V-shaped section with two flanks and only the rail upper groove 10 is a groove with a single flank. However, in the second embodiment, a rail lower groove 10, a rail upper groove 10, a slider upper groove 11, and a slider lower groove 11 are all grooves with a single flank as illustrated in FIG. 24.

Respective flanks included in the rail lower groove 10, the rail upper groove 10, the slider upper groove 11, and the slider lower groove 11 will be described by taking the flank of the slider upper groove 11 as an example. As illustrated in FIG. 25, the flank of the slider upper groove 11 includes a main arc portion 21 having an arc sectional shape and placed generally in a center of the flank in a width direction, a groove shoulder side sub-arc portion 23 having an arc sectional shape and formed continuously from a groove shoulder side (an inner side of a guide rail 1 in the width direction) of the main arc portion 21, and a groove bottom side sub-arc portion 25 having an arc sectional shape and formed continuously from a groove bottom side (an outer side of the guide rail 1 in the width direction) of the main arc portion 21.

A chamfer 32 (C-chamfer) is formed in an edge portion of the slider upper groove 11 on the groove shoulder side and an undercut portion 33 is formed in an edge portion on the groove bottom side, so that magnitudes of the arc central angles Hp, Hm of the groove shoulder side sub-arc portion 23 and the groove bottom side sub-arc portion 25 are limited by dimensions of the chamfer 32 on the groove shoulder and the undercut portion 33 on the groove bottom side. Note that a type of the chamfer is not limited particularly, but the chamfer on the groove shoulder side may be an R-chamfer. Other configurations are similar to the rail upper groove 10 in the first embodiment. With such a configuration, it is possible to obtain an effect similar to the first embodiment.

Note that the first embodiment and the second embodiment just provide an example of the present invention, and the present invention is not limited to the first embodiment and the second embodiment. For example, in terms of respective values of the arc central angles K, Hp, Hm and the curvature radiuses r1, r2p, r2m of the main arc portion 21, the groove shoulder side sub-arc portion 23, and the groove bottom side sub-arc portion 25, the above values are examples, and the present invention is not limited to those values.

REFERENCE SIGNS LIST

1 ... guide rail
2 ... slider
3 ... ball
10 ... raceway groove
11 ... raceway groove
13 ... rolling passage
20U ... upper flank
20L ... lower flank
21 ... main arc portion
23 ... groove shoulder side sub-arc portion
25 ... groove bottom side sub-arc portion

The invention claimed is:
1. A linear motion guide device comprising a guide rail, a slider, and a plurality of balls, wherein
the guide rail and the slider include respective raceway grooves at positions opposed to each other to form a rolling passage for the balls,
the respective raceway grooves extend in a longitudinal direction of the guide rail,
the balls are placed in the rolling passage,
the slider is guided by the guide rail so as to be movable in the longitudinal direction through rolling of the balls in the rolling passage,
a flank included in the raceway grooves includes a main arc portion having an arc sectional shape and placed in a center of the flank in a width direction, a groove shoulder side sub-arc portion having an arc sectional shape and formed continuously from a groove shoulder side of the main arc portion, and a groove bottom side sub-arc portion having an arc sectional shape and formed continuously from a groove bottom side of the main arc portion, and a curvature radius r2p of the groove shoulder side sub-arc portion is different from a curvature radius r2m of the groove bottom side sub-arc portion.

2. The linear motion guide device according to claim 1, wherein assuming that an arc central angle of the groove shoulder side sub-arc portion is Hp and an arc central angle of the groove bottom side sub-arc portion is Hm, the following condition A or condition B is satisfied:

$$Hp>Hm \text{ and } r2p<r2m, \quad \text{Condition A:}$$

$$Hp<Hm \text{ and } r2p>r2m. \quad \text{Condition B:}$$

3. The linear motion guide device according to claim 1, wherein in terms of all flanks making contact with the balls among the flanks, their main arc portions have the same curvature radius r1, their groove shoulder side sub-arc portions have the same curvature radius r2p, and their groove bottom side sub-arc portions have the same curvature radius r2m, and in all the flanks making contact with the balls among the flanks, assuming that a minimum value in arc central angles Hp of the groove shoulder side sub-arc portions is Hpmin and a minimum value in arc central angles Hm of the groove bottom side sub-arc portions is Hmmin, the following condition C or condition D is satisfied:

$$Hp\text{min}>Hm\text{min and } r2p<r2m, \quad \text{Condition C:}$$

$$Hp\text{min}<Hm\text{min and } r2p>r2m. \quad \text{Condition D:}$$

4. The linear motion guide device according to claim 1, wherein the main arc portion and the groove shoulder side sub-arc portion are smoothly connected to each other to share a tangent.

5. The linear motion guide device according to claim 1, wherein the main arc portion and the groove bottom side sub-arc portion are smoothly connected to each other to share a tangent.

6. The linear motion guide device according to claim 1, wherein the main arc portion is placed in an equal range toward both sides of the flank in the width direction around a contact point between the ball and the flank, and an arc central angle K of the main arc portion is 40°.

7. The linear motion guide device according to claim 1, wherein the curvature radius r1 of the main arc portion is not less than 0.51 times but not more than 0.52 times as large as the diameter of the balls.

8. The linear motion guide device according to claim 1, wherein at least one of the raceway grooves is a gothic-arc groove having a V-shaped section with two flanks, and one of the two flanks included in the raceway groove is a main flank that makes contact with the balls at the time of use and the other one of the two flanks is a sub-flank that does not make contact with the balls at the time of use.

9. The linear motion guide device according to claim 8, wherein sectional shapes of the main flank and the sub-flank form a line symmetry to each other.

10. A linear motion guide device comprising a guide rail, a slider, and a plurality of balls, wherein the guide rail and the slider include raceway grooves at positions opposed to each other to form a rolling passage for the balls, the respective raceway grooves extend in a longitudinal direction of the guide rail, the balls are placed in the rolling passage, the slider is guided by the guide rail so as to be movable in the longitudinal direction through rolling of the balls in the rolling passage, a flank included in the raceway grooves includes a main arc portion having an arc sectional shape and placed in a center of the flank in a width direction, and a groove shoulder side sub-arc portion having an arc sectional shape and formed continuously from a groove shoulder side of the main arc portion, when an arc central angle Hp of the groove shoulder side sub-arc portion is not less than 4° but less than 6°, a curvature radius r2p of the groove shoulder side sub-arc portion is more than 0.62 times as large as a diameter of the balls, when the arc central angle Hp of the groove shoulder side sub-arc portion is not less than 6° but less than 10°, the curvature radius r2p of the groove shoulder side sub-arc portion is more than 0.54 times but not more than 0.62 times as large as the diameter of the balls, and when the arc central angle Hp of the groove shoulder side sub-arc portion is not less than 10°, the curvature radius r2p of the groove shoulder side sub-arc portion is not more than 0.54 times as large as the diameter of the balls.

11. A linear motion guide device comprising a guide rail, a slider, and a plurality of balls, wherein, the guide rail and the slider include raceway grooves at positions opposed to each other to form a rolling passage for the balls, the respective raceway grooves extend in a longitudinal direction of the guide rail, the balls are placed in the rolling passage, the slider is guided by the guide rail so as to be movable in the longitudinal direction through rolling of the balls in the rolling passage, a flank included in the raceway grooves includes a main arc portion having an arc sectional shape and placed in a center of the flank in a width direction, and a groove bottom side sub-arc portion having an arc sectional shape and formed continuously from a groove bottom side of the main arc portion, when an arc central angle Hm of the groove bottom side sub-arc portion is not less than 4° but less than 6°, a curvature radius r2m of the groove bottom side sub-arc portion is more than 0.62 times as large as a diameter of the balls, when the arc central angle Hm of the groove bottom side sub-arc portion is not less than 6° but less than 10°, the curvature radius r2m of the groove bottom side sub-arc portion is more than 0.54 times but not more than 0.62 times as large as the diameter of the balls, and when the arc central angle Hm of the groove bottom side sub-arc portion is not less than 10°, the curvature radius r2m of the groove bottom side sub-arc portion is not more than 0.54 times as large as the diameter of the balls.

12. A linear motion guide device comprising a guide rail, a slider, and a plurality of balls, wherein
the guide rail and the slider include raceway grooves at positions opposed to each other to form a rolling passage for the balls,
the respective raceway grooves extend in a longitudinal direction of the guide rail,
the balls are placed in the rolling passage,
the slider is guided by the guide rail so as to be movable in the longitudinal direction through rolling of the balls in the rolling passage,
a flank included in the raceway grooves includes a main arc portion having an arc sectional shape and placed generally in a center of the flank in a width direction, and a groove shoulder side sub-arc portion having an arc sectional shape and formed continuously from a groove shoulder side of the main arc portion,
in terms of all flanks making contact with the balls among the flanks, their main arc portions have the same curvature radius r1, and their groove shoulder side sub-arc portions have the same curvature radius r2p; and
in terms of all the flanks making contact with the balls among the flanks, assuming that a minimum value in arc central angles Hp of the groove shoulder side sub-arc portions is Hpmin,
when Hpmin is not less than 4° but less than 6°, the curvature radius r2p of the groove shoulder side sub-arc portions is more than 0.62 times as large as a diameter of the balls,
when Hpmin is not less than 6° but less than 10°, the curvature radius r2p of the groove shoulder side sub-arc portions is more than 0.54 but not more than 0.62 times as large as the diameter of the balls, and
when Hpmin is not less than 10°, the curvature radius r2p of the groove shoulder side sub-arc portions is not more than 0.54 times as large as the diameter of the balls.

13. A linear motion guide device comprising a guide rail, a slider, and a plurality of balls, wherein:
the guide rail and the slider include raceway grooves at positions opposed to each other to form a rolling passage for the balls,
the respective raceway grooves extend in a longitudinal direction of the guide rail,
the balls are placed in the rolling passage,
the slider is guided by the guide rail so as to be movable in the longitudinal direction through rolling of the balls in the rolling passage,
a flank included in the raceway grooves includes a main arc portion having an arc sectional shape and placed in a center of the flank in a width direction, and a groove bottom side sub-arc portion having an arc sectional shape and formed continuously from a groove bottom side of the main arc portion,
in terms of all flanks making contact with the balls among the flanks, their main arc portions have the same curvature radius r1 and their groove bottom side sub-arc portions have the same curvature radius r2m, and
in terms of all the flanks making contact with the balls among the flanks, assuming that a minimum value in arc central angles Hm of the groove bottom side sub-arc portions is Hmmin,
when Hmmin is not less than 4° but less than 6°, the curvature radius r2m of the groove bottom side sub-arc portions is more than 0.62 times as large as a diameter of the balls,
when Hmmin is not less than 6° but less than 10°, the curvature radius r2m of the groove bottom side sub-arc portions is more than 0.54 but not more than 0.62 times as large as the diameter of the balls, and
when Hmmin is not less than 10°, the curvature radius r2m of the groove bottom side sub-arc portions is not more than 0.54 times as large as the diameter of the balls.

14. A linear motion guide device comprising a guide rail, a slider, and a plurality of balls, wherein
the guide rail and the slider include raceway grooves at positions opposed to each other to form a rolling passage for the balls,
the respective raceway grooves extend in a longitudinal direction of the guide rail,
the balls are placed in the rolling passage,
the slider is guided by the guide rail so as to be movable in the longitudinal direction through rolling of the balls in the rolling passage,
a flank included in the raceway grooves includes a main arc portion having an arc sectional shape and placed in a center of the flank in a width direction, a groove shoulder side sub-arc portion having an arc sectional shape and formed continuously from a groove shoulder side of the main arc portion, and a groove bottom side sub-arc portion having an arc sectional shape and formed continuously from a groove bottom side of the main arc portion,
in terms of all flanks making contact with the balls among the flanks, their main arc portions have the same curvature radius r1, their groove shoulder side sub-arc portions have the same curvature radius r2p, and their groove bottom side sub-arc portions have the same curvature radius r2m, and
in terms of all the flanks making contact with the balls among the flanks, assuming that a minimum value in arc central angles Hp of the groove shoulder side sub-arc portions is Hpmin and a minimum value in arc central angles Hm of the groove bottom side sub-arc portions is Hmmin,
when Hpmin is not less than 4° but less than 6°, the curvature radius r2p of the groove shoulder side sub-arc portions is more than 0.62 times as large as a diameter of the balls,
when Hpmin is not less than 6° but less than 10°, the curvature radius r2p of the groove shoulder side sub-arc portions is more than 0.54 but not more than 0.62 times as large as the diameter of the balls,
when Hpmin is not less than 10°, the curvature radius r2p of the groove shoulder side sub-arc portions is not more than 0.54 times as large as the diameter of the balls,
when Hmmin is not less than 4° but less than 6°, the curvature radius r2m of the groove bottom side sub-arc portions is more than 0.62 times as large as a diameter of the balls,
when Hmmin is not less than 6° but less than 10°, the curvature radius r2m of the groove bottom side sub-arc portions is more than 0.54 but not more than 0.62 times as large as the diameter of the balls, and
when Hmmin is not less than 10°, the curvature radius r2m of the groove bottom side sub-arc portions is not more than 0.54 times as large as the diameter of the balls.

\* \* \* \* \*